United States Patent
Weng et al.

(10) Patent No.: US 12,067,978 B2
(45) Date of Patent: Aug. 20, 2024

(54) METHODS AND SYSTEMS FOR CONFUSION REDUCTION FOR COMPRESSED ACOUSTIC MODELS

(71) Applicant: Samsung Electronics Co., Ltd., Suwon-si (KR)

(72) Inventors: Fuliang Weng, Itasca, IL (US); Alexei Ivanov, Itasca, IL (US); Stephen Cradock, Itasca, IL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 17/335,663

(22) Filed: Jun. 1, 2021

(65) Prior Publication Data

US 2021/0375270 A1 Dec. 2, 2021

Related U.S. Application Data

(60) Provisional application No. 63/033,434, filed on Jun. 2, 2020.

(51) Int. Cl.
*G10L 15/065* (2013.01)
*G06F 40/237* (2020.01)
(Continued)

(52) U.S. Cl.
CPC .......... *G10L 15/187* (2013.01); *G06F 40/237* (2020.01); *G10L 15/22* (2013.01)

(58) Field of Classification Search
CPC ......... G10L 15/26; G10L 15/22; G10L 15/18; G10L 15/32; G10L 15/24; G10L 15/142;
(Continued)

(56) References Cited

U.S. PATENT DOCUMENTS 6,073,099 A * 6/2000 Sabourin ............... G10L 15/187
704/254
6,185,530 B1 * 2/2001 Ittycheriah ............. G10L 15/10
707/999.005

(Continued)

OTHER PUBLICATIONS

Fazel-Zarandi et al., Investigation of error simulation techniques for learning dialog policies for conversational error recovery, Nov. 2019, arXiv preprint arXiv:1911.03378. Nov. 8, 2019.pp. 1-12 (Year: 2019).*

*Primary Examiner* — Olujimi A Adesanya
(74) *Attorney, Agent, or Firm* — Jefferson IP Law, LLP

(57) ABSTRACT

Methods and systems are disclosed herein for improvements relating to compressed automatic speech recognition (ASR) systems. The ASR system may comprise a compressed acoustic engine and an adaptive decoder. The adaptive decoder may be dynamically compiled based on characteristics of the compressed acoustic engine and a current state of the application device. In some embodiments, a dynamic command list is used to manage context-specific commands. Two or more commands recognized by the adaptive decoder may be confusable due to compression of the ASR system. Alternate commands may be determined that are semantically equivalent but phonetically different than the confusable commands to reduce classification error of the adaptive decoder. An alternate command may replace one or more of the confusable commands in the adaptive decoder. In some embodiments, a user interface is displayed to a user of the ASR system to select the alternate command for replacement in the decoder.

20 Claims, 13 Drawing Sheets

(51) Int. Cl.
*G10L 15/187* (2013.01)
*G10L 15/22* (2006.01)

(58) Field of Classification Search
CPC . G10L 15/28; G10L 2015/223; G10L 15/083; G10L 21/00; G10L 13/00; G10L 2015/086; G10L 2015/088
See application file for complete search history.

(56) References Cited

U.S. PATENT DOCUMENTS

| | | | |
|---|---|---|---|
| 6,535,850 B1* | 3/2003 | Bayya | G10L 15/07 |
| | | | 704/254 |
| 7,319,959 B1 | 1/2008 | Watts | |
| 9,224,386 B1* | 12/2015 | Weber | G10L 15/06 |
| 9,437,188 B1 | 9/2016 | Medina et al. | |
| 9,697,827 B1* | 7/2017 | Lilly | G10L 15/19 |
| 10,320,780 B2 | 6/2019 | Klein et al. | |
| 11,232,786 B2* | 1/2022 | Tiwari | G10L 15/197 |
| 11,250,311 B2* | 2/2022 | Johansen | G06N 3/044 |
| 2002/0138265 A1* | 9/2002 | Stevens | G10L 15/22 |
| | | | 704/E15.04 |
| 2003/0125945 A1* | 7/2003 | Doyle | G10L 15/01 |
| | | | 704/E15.002 |
| 2004/0181408 A1* | 9/2004 | Acero | G10L 15/144 |
| | | | 704/E15.048 |
| 2006/0116877 A1* | 6/2006 | Pickering | G10L 15/08 |
| | | | 704/231 |
| 2010/0179812 A1* | 7/2010 | Jang | G10L 15/065 |
| | | | 704/E15.046 |
| 2011/0282667 A1* | 11/2011 | Hernandez-Abrego | |
| | | | G10L 15/19 |
| | | | 704/E15.005 |
| 2011/0288867 A1* | 11/2011 | Chengalvarayan | |
| | | | G10L 15/1815 |
| | | | 704/251 |
| 2014/0114665 A1 | 4/2014 | Murgia | |
| 2015/0106082 A1* | 4/2015 | Ge | G10L 15/063 |
| | | | 704/10 |
| 2015/0127347 A1* | 5/2015 | Tjalve | G10L 25/78 |
| | | | 704/257 |
| 2017/0154620 A1 | 6/2017 | Berthelsen et al. | |
| 2017/0206898 A1 | 7/2017 | Bernard et al. | |
| 2018/0061396 A1 | 3/2018 | Srinivasan et al. | |
| 2018/0174574 A1 | 6/2018 | Laroche | |
| 2018/0315416 A1 | 11/2018 | Berthelsen et al. | |
| 2021/0210109 A1* | 7/2021 | Weng | G10L 15/187 |

\* cited by examiner

METHODS AND SYSTEMS FOR CONFUSION REDUCTION FOR COMPRESSED ACOUSTIC MODELS

CROSS-REFERENCE TO RELATED APPLICATIONS

The present application claims priority to and benefit of U.S. Provisional Application No. 63/033,434, filed Jun. 2, 2020, the entire disclosure of which is hereby incorporated by reference herein.

TECHNICAL FIELD

The present disclosure relates generally to the field of speech processing systems, and more specifically, to improved speech recognition for compressed acoustic models.

BACKGROUND

Speech recognition is used in a variety of applications, such as speech-to-text conversion, voice commands, and audio file processing. Speech recognition systems may be implemented in many electronic devices, such as, for example, smart speakers, smart TV's, gaming stations, and smart phones. Speech recognition may also be implemented within an Internet-of-Things network such that a user can interact with a variety of interconnected devices using spoken commands.

Typically, speech recognition is performed on a main processing circuit of the device or system. It is desirable to implement speech recognition on an edge device for improved privacy and always-available speech recognition. However, edge devices may generally have stricter power or memory constraints than a main processing circuit that may hinder a typical speech recognition system. Model compression may help to meet restricted space requirements but create higher error rates. There exists a need to develop improved speech recognition in systems with hardware constraints.

SUMMARY OF THE INVENTION

Various embodiments of the present application relate to a system for automatic speech recognition, the system comprising a processing circuit communicably coupled to an acoustic engine and a decoder, the processing circuit configured to expand a speech lexicon of the decoder with recovered grapheme or phoneme sequences corresponding to a first command and a second command represented in the speech lexicon; determine a confusability metric corresponding to classification of the first command and the second command by the decoder, the confusability metric indicative of a probability the first command is classified as the second command; determine an alternate command corresponding to the first command or the second command, the alternate command phonetically different than the first command or the second command; and replace the first command or the second command in the speech lexicon with the alternate command responsive to the a determination the confusability metric exceeds a threshold value.

In some embodiments, the confusability metric is a value in an n-gram confusion matrix.

In some embodiments, the processing circuit is further configured to determine a single command from the group consisting of the first command and the second command to replace in the speech lexicon.

In some embodiments, the system further includes a user interface, wherein the determination of the single command is based on a user input.

In some embodiments, the alternate command is a selected alternate command, and wherein to determine the selected alternate command, the processing circuit is further configured to retrieve a first alternate command corresponding to the first command and a second alternate command corresponding to the second command; send, via the user interface, a prompt to a user, the prompt comprising a request to select a first option to replace the first command with the first alternate command or a second option to replace the second command with the second alternate command; and receive, via the user interface, an indication from the user of a selection of the first option or the second option, wherein the first alternate command or the second alternate command is designated as the selected alternate command based on the selection.

In some embodiments, the alternate command is a selected alternate command, and wherein to determine the selected alternate command, the processing circuit is further configured to retrieve a first alternate command and a second alternate command, the first alternate command and the second alternate command corresponding to the single command; send, via the user interface, a prompt to a user, the prompt comprising a request to select a first option to replace the first command with the first alternate command or a second option to replace the first command with the second alternate command; and receive, via the user interface, an indication from the user of a selection of the first option or the second option, wherein the first alternate command or the second alternate command is designated the selected alternate command based on the selection.

In some embodiments, the acoustic engine comprises a compressed acoustic model, the compressed acoustic model configured in less than 10 MB of memory storage.

In some embodiments, the processing circuit is further configured to remove the first command or second command from a list of context-specific commands from which the decoder is compiled.

In some embodiments, the processing circuit is further configured to add the alternate command to the list of context-specific commands, the alternate command performing the same function as the removed first command or second command.

Various embodiments of the present disclosure relate to a system for automatic speech recognition, the system comprising an acoustic engine configured to generate hypothesis sequences from speech utterances, the acoustic engine comprising a compressed acoustic model; a decoder based on a speech lexicon and a dynamic command list, the speech lexicon comprising grapheme or phoneme sequences in association with command labels, and the command list being compiled onto the decoder as a language model (LM) dynamically loaded based on the state or context of the system; and processing electronics configured to: determine grapheme or phoneme sequences with an classification error measurement exceeding a first threshold value, the classification error measurement based on the renormalize weights; expand the speech lexicon with the grapheme or phoneme sequences; renormalize weights of the speech lexicon corresponding to a first command and a second command in the speech lexicon; determine a confusability metric of the first command and the second command, the confusability metric based on the renormalized weights; determine an alternate command corresponding to the first command or the second command; and replace the first command or the second command in the speech lexicon with the alternate command responsive to a determination the confusability metric satisfies a second threshold value.

In some embodiments, the confusability metric is a value in an n-gram confusion matrix indicating a probability the first command is classified as the second command.

In some embodiments, the alternate command corresponds to one of the first command or the second command, the alternate command semantically equivalent to the one of the first command or the second command and is phonetically different than the one of the first command or the second command.

In some embodiments, the system further comprises a user interface, wherein the determination of the single command is based on a user input.

In some embodiments, the alternate command is a selected alternate command, wherein the processing electronics are further configured to retrieve a first alternate command corresponding to the first command and a second alternate command corresponding to the second command; send, via the user interface, a prompt to a user, the prompt comprising a request to select a first option to replace the first command with the first alternate command or a second option to replace the second command with the second alternate command; and receive, via the user interface, an indication from the user of a selection of the first option or the second option, wherein the first alternate command or the second alternate command is designated as the selected alternate command based on the selection.

In some embodiments, the alternate command is a selected alternate command, wherein the processing electronics are further configured to retrieve a first alternate command and a second alternate command, the first alternate command and the second alternate command corresponding to the single command; send, via the user interface, a prompt to a user, the prompt comprising a request to select a first option to replace the first command with the first alternate command or a second option to replace the first command with the second alternate command; and receive, via the user interface, an indication from the user of a selection of the first option or the second option, wherein the first alternate command or the second alternate command is designated the selected alternate command based on the selection.

In some embodiments, the compressed acoustic model is stored in less than 10 MB of memory storage.

Various embodiments of the present disclosure relate to a method for expanding a lexicon of a command recognition system, the method comprising the steps of determining grapheme or phoneme sequences with an error measurement exceeding a first threshold value; expanding a speech lexicon with the grapheme or phoneme sequences; renormalizing weights of the speech lexicon corresponding to lexicon entries; determine a first command and a second command with a confusability metric exceeding a second threshold value, the confusability metric based on the renormalized weights; determine an alternate command corresponding to one of the first command or the second command; removing the one of the first command or the second command from the speech lexicon; and expanding the speech lexicon to include an entry for the alternate command.

In some embodiments, the alternate command is semantically equivalent but phonetically different than the corresponding one of the first command or the second command.

In some embodiments, the method also includes the step of sending a prompt to a user with a request to replace the corresponding one of the first command or the second command with the alternate command.

In some embodiments, the method also includes the step of removing the first command or second command from a list of context-specific commands from which the speech lexicon is compiled.

DETAILED DESCRIPTION

Overview

Figure 1:
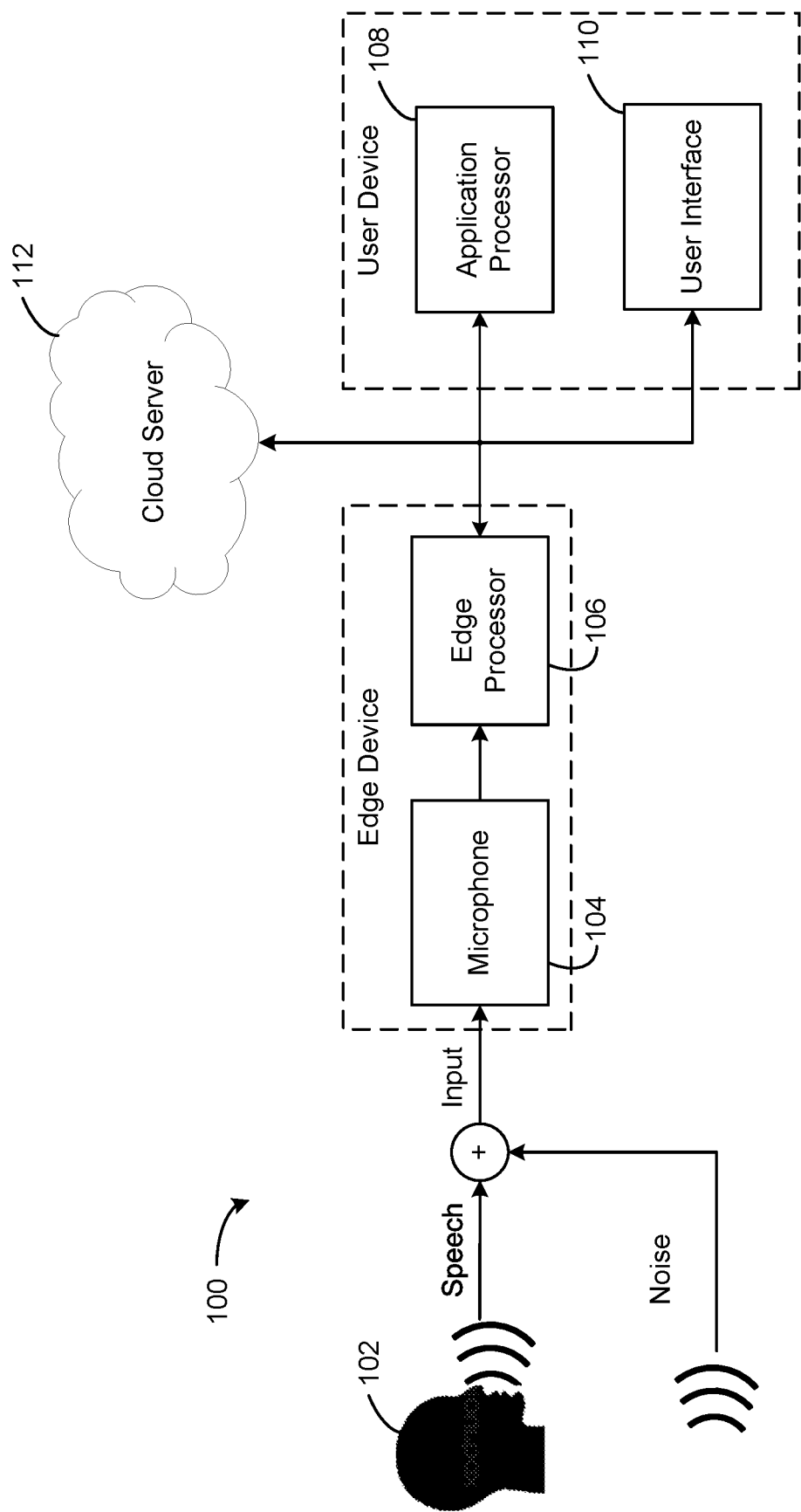
FIG. 1 is a diagram of a system for speech recognition, according to some embodiments.

Referring generally to the figures, systems, methods, and apparatuses are shown for improved speech recognition in audio processing systems. Specifically, the methods and systems herein disclose a dynamic command-recognition system with reduced command confusability in systems with constrained hardware devices.

An automatic speech recognition (ASR) system may generally include an acoustic engine and a decoder. The acoustic engine transcribes spoken utterances from an audio stream into a sequence of phoneme, grapheme, or other phonetic symbols using an acoustic model. The decoder receives the sequence of symbols from the acoustic engine and determines a voice command spoken by the user. The determined voice command can then be used by a processing system to perform an action or change a state of the system. In some implementations, a user may be prompted or required to use a trigger word or phrase (e.g. keyword) before speaking a command phrase. The trigger word or phrase may be used to activate components of the ASR system to reduce power consumption in idle states.

Previously, ASR algorithms have been performed by a system's main application processor (used interchangeably herein with central processing system or application processing system). Application processors may be understood to have fewer hardware constraints compared to other processing devices, such as DSP (digital signal processors) or edge processing devices, in the system. However, it is generally desirable to move ASR processing from the application processor to an edge processor (used interchangeably herein with edge processing system). By performing ASR processing on the edge processor, processing loads on the application processor are reduced. Additionally, edge processors generally have much lower power consumption than application processors, and thus can operate in a battery-powered always-on configuration, such as earbuds, smartphones, alarms. Third, since application processors generally include a network or internet interface, conversations processed by the application processor are susceptible to an outside breach; ASR on edge devices therefore preserves the privacy of a user's data with an additional layer of abstraction.

Edge processors may generally have reduced memory space or fewer processing circuits compared to the application processor in a distributed processing system. Small edge processors may be desired to reduce hardware cost and power consumption for an edge device. In implementations where the edge device is powered by a battery, the size or complexity of the edge processor may be limited by to meet a desired battery life of the edge device. In order to implement an ASR algorithm on an edge processor, one or more ASR models may be compressed to reduce the size and complexity of the ASR system. For example, an ASR system may use a compressed acoustic model to generate a sequence of graphemes or phonemes from an audio signal with spoken language. However, by compressing the acoustic model, the system produces a higher error rate, which may hinder the performance of the system. In some embodiments, a grapheme or phoneme acoustic model compressed to less than 3 MB produces an error rate of approximately over 10%.

To improve the accuracy rate of the ASR system, the decoder may be adaptively expanded based on sample data processed using the compressed acoustic model to recover lost grapheme or phoneme sequences at the acoustic engine stage. The methods and systems herein may identify grapheme or phoneme sequences with the highest error rate in the compressed acoustic model and train the decoder to associate these sequences with the intended command. In some embodiments, the systems and method can use interchangeable command lists to further reduce the storage size of the decoder, such that only commands relevant to the context of the current state of the system are loaded onto the decoder. However, due to the compression of the acoustic model, as well as the expansion of the speech decoder with the additional grapheme or phoneme sequences, commands recognized by the ASR system may have increase confusability during recognition of a spoken command or phrase, wherein a first command is mistakenly classified as the second command by the decoder based on phonetic similarity between the two commands. Therefore, there exists a need for reduced confusability between commands in a constrained ASR system.

The present application provides various solutions to this issue by determining two or more confusable commands at the decoder stage and replace at least a single command of the one or more confusable commands with an alternate command that is semantically equivalent to but phonetically different than the single commands. By dynamically replacing the single confusable command with the alternate command, a user may be able to interact with the improved ASR system to perform all the same functions with a higher accuracy rate due to the further distinguished phonetic characteristics of the alternate command from the confusable commands. The present application further details embodiments wherein a user may interact with the ASR system via a user interface, where the user is presented two or more alternative replacements from which to choose. The alternate commands may be changed in context-specific scenarios, such as via changes to one or more dynamic command lists, or applied universally to the application.

Referring now to FIG. 1, a diagram for a speech recognition system 100 using an edge processor is shown, according to one embodiment. System 100 includes a microphone 104, edge processor 106, application processor 108, and user interface 110. System 100 may be configured as a distributed system such that a spoken command received from a user 102 is processed by both the edge processor 106 and the application processor 108. The processing devices of system 100 may generally manage and execute a dynamic command recognition system to recognize commands spoken by user 102.

The microphone 104 may include one or more microphones or acoustic sensors configured to receive audio signals from an environment. The audio signal may include spoken language by the user 102 as well as noise from the environment. The microphone 104 may send the received audio signal to the edge processor 106. Additionally or alternatively, in some embodiments, the microphone 104 sends the received audio signal to the application processor 108. The edge device may further include additional components (not shown) to process the audio signal from the microphone 104, for example to reduce or otherwise ameliorate the effects of noise.

Edge processor 106 may be any processing device that performs one or more specific function within a processing system. Edge processor 106 can be implemented as a general purpose processor, one or more microprocessors, a digital signal processor, an application specific integrated circuit (ASIC), one or more field programmable gate arrays (FPGAs), a group of processing components, or other suitable electronic processing components. In some embodiments, edge processor 106 is a digital signal processor. Edge processor 106 may have one or more storage devices that store instructions thereon that, when executed by one or more processors, cause the one or more processors to facilitate the various processes described in the present disclosure. The one or more storages devices may include random access memory (RAM), read-only memory (ROM), hard drive storage, temporary storage, non-volatile memory, flash memory, optical memory, or any other suitable memory for storing software objects and/or computer instructions. Edge processor 106 may be configured to dynamically receive processing instructions, configuration files, or machine code from application processor 108 to determine processes to be performed by edge processor 106. For example, edge processor 106 may receive a compressed acoustic model or language model from application processor 108 and store the model in the one or more storage devices.

Edge processor 106 is communicably coupled to the application processor 108 through one or more communications interfaces. The one or more communications interfaces may include wired or wireless interfaces (e.g., jacks, antennas, transmitters, receivers, transceivers, wire terminals, etc.) for conducting data communications with various systems, devices, or networks. For example, the one or more communications interfaces may include a Bluetooth module and antenna for sending data to and receiving data from the application processor 108 via a Bluetooth-protocol network. As another example, the communications interfaces may include an Ethernet card and port for sending and receiving data via an Ethernet-based communications network or a WiFi transceiver for communicating via a wireless communications network. The one or more communications interfaces may be configured to communicate via local area networks or wide area networks (e.g., the Internet, a building WAN, etc.) and may use a variety of communications protocols.

Edge processor 106 may generally have stricter hardware constraints than application processor 108. Hardware constraints may be understood as limiting at least one of memory storage, power consumption, clock speed, number of processors, or processing speed of a device. For example, edge processor 106 may have less memory storage than the application processor 108. In addition or alternatively, edge processor 106 may have fewer processing circuits than application processor 108. A processing device may be constrained to reduce the cost of implementing the processing device, or reduce overall power usage of the application such that the constrained processing device can continuously process an audio stream for spoken commands (e.g., operate in an always-on mode).

Application processor 108 may be one or more processing circuits that execute and/or facilitate the process flow of the main device or system. Application processor 108 can be implemented as a general purpose processor, one or more microprocessors, a digital signal processor, an application specific integrated circuit (ASIC), one or more field programmable gate arrays (FPGAs), a group of processing components, or other suitable electronic processing components. Application processor 108 may be configured to receive computer instructions stored on one or more storage devices incorporated into application processor 108 or received from other computer readable media (e.g., CDROM, network storage, a remote server, etc.) that, when executed by one or more processors, cause the one or more processors to facilitate the various processes described in the present disclosure. The one or more storages devices may include random access memory (RAM), read-only memory (ROM), hard drive storage, temporary storage, non-volatile memory, flash memory, optical memory, or any other suitable memory for storing software objects and/or computer instructions. Application processor 108 may include database components, object code components, script components, or any other type of information structure for supporting the various activities and information structures described in the present disclosure. In some embodiments, application processor 108 includes a software application downloadable from a digital marketplace for retrieving and updating components and resources of the speech recognition system 100.

Application processor 108 is communicably coupled to the edge processor 106 through one or more communications interfaces. The one or more communications interfaces may include wired or wireless interfaces (e.g., jacks, antennas, transmitters, receivers, transceivers, wire terminals, etc.) for conducting data communications with various systems, devices, or networks. For example, the one or more communications interfaces may include a Bluetooth module and antenna for sending data to and receiving data from the edge processor 106 via a Bluetooth-protocol network. As another example, the communications interfaces may include an Ethernet card and port for sending and receiving data via an Ethernet-based communications network or a WiFi transceiver for communicating via a wireless communications network. The one or more communications interfaces may be configured to communicate via local area networks or wide area networks (e.g., the Internet, a building WAN, etc.) and may use a variety of communications protocols. In addition, application processor 108 may be configured to access servers and data other than edge processor 106 to send and receive data. For example, application processor 108 may be configured to receive models or training data from another server via the Internet.

User interface 110 enables the user 102 or another user to control and interact with the system 100. User interface 110 may be, for example, a mobile device, such as a cell phone, smart phone, smart watch, tablet, laptop, or other computing device. In such embodiments, the user interface 110 may include a graphical user interface (GUI) display presented to the user capable of receiving user input a touchscreen, button, keyboard, mouse, or other input means. In some embodiments, the user interface 110 includes a software application downloadable to the mobile device from a digital marketplace and operable for execution by the operating system of the mobile device. In some embodiments, user interface 110 is a processing circuit with a speaker for outputting audio to the user 102, and a microphone (or in some embodiments, microphone 104) for receiving verbal user input. In some embodiments, user interface 110 includes one or more buttons on a wearable device comprising the microphone 104. User interface 110 may be coupled to the edge processor 106, application processor 108, or both edge processor 106 and application processor 108. The user interface 110 may receive output of the edge processor 106 or application processor 108 regarding operation of the ASR system. User interface 110 may also be configured to receive user input regarding control of the ASR system and send the user input to the edge processor 106 or application processor 108.

Cloud server 112 may be communicably coupled to the application processor 108 and/or edge processor 106 to provide information, software, and language model resources to the speech recognition system 100. Cloud server 112 may be configured as one or more remote servers executing instructions on one or more processors. Cloud sever 112 may be coupled to one or more device in the speech recognition system 100 via an internet connection, for example. In some embodiments, the cloud server 112 sends a software application to the application processor 108 comprising language models, instructions for connecting to the edge processor 106 and/or the edge device, or a combination thereof. The cloud server 112 may also send updates to models, databases, or software functions of the application processor 108 and/or edge processor 106. In some embodiments, the cloud server 112 sends software updates or language models to the application processor 108 to be forwarded to the edge processor 106 once communication is established between the application processor 108 and edge processor 106. In some embodiments, cloud server 112 may comprise one or more of the databases as will be described in further detail below, such that the application processor 108 or edge processor 106 may query the cloud server 112 to retrieve entries in the database. In some embodiments, the cloud server 112 may perform one or more of the functions of the edge processor 106 or application processor 108 as will be described below. Such embodiments may advantageously further reduce memory or processing load from edge processor 106 and application processor 108 by, for example, offloading larger models or more complex functions to a remote server with more computational resources.

Edge processor 106 and application processor 108 may be configured within the same or different device. In some embodiments, edge processor 106 is configured in an edge device separate from a main device that comprises the application processor 108. The edge device may be, for example, a headset, earbud, headphones, smart speaker, smart microphone, or smart phone, while the main device may be a smart phone, tablet, laptop, smart speaker, or remote server. In some embodiments, the edge device is a wearable device (e.g., headset, earbuds, headphones) and the main device is a mobile device of the user (e.g., smart phone, smart watch, tablet, tablet, etc.). In some embodiments, the main device includes a software application configured for managing the ASR system running on the edge device. Likewise, user interface 110 and application processor 108 may be configured within the same or different devices. For example, user interface 110 and application processor 108 may both be implemented by a smart phone of the user. In other embodiments, user interface 110 and application processor 108 are implemented as separate devices, such as a smart phone implementing the user interface and a remote server implementing the application processor. Other configurations of the user interface 110, application processor 108, and edge processor 106 will be appreciated than those discussed herein.

In various embodiments of the present application, the adaptive ASR system can be implemented on the edge processor 106 and application processor 108 in less than about 7 MB of memory storage. In some embodiments, the adaptive ASR system can be implemented in less than about 5 MB of memory storage. A compressed acoustic model may be used in the present application that is stored in less than 4 MB of memory. The edge processor 106 implementing the adaptive ASR system may have a power consumption less than about 80 mW. In some embodiments, the edge processor 106 uses less than about 10 mW of power.

Adaptive ASR System

Figure 2:
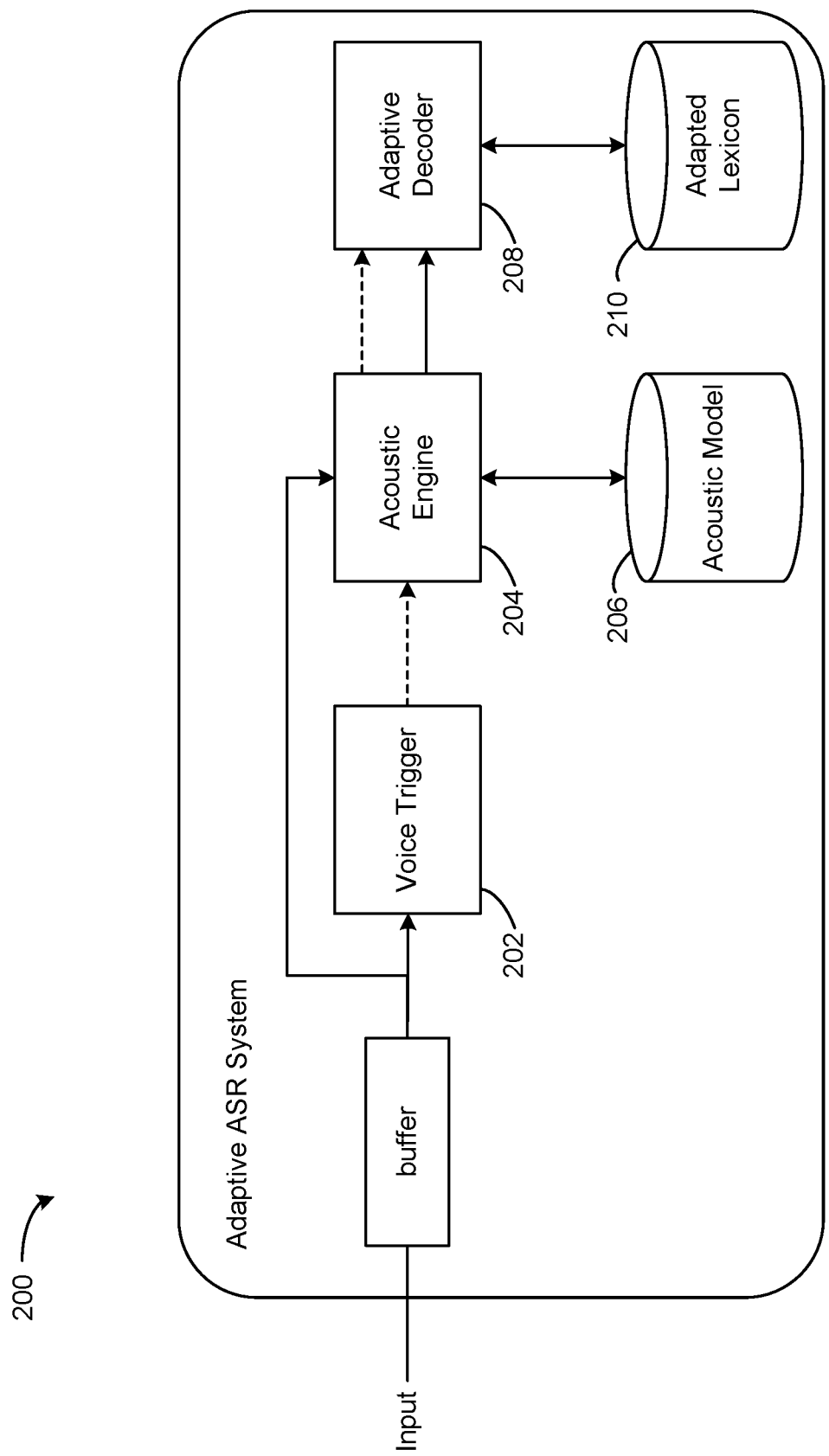
FIG. 2 is a diagram of a dynamic command processing system, according to some embodiments.

Referring now to FIG. 2, a block diagram for an adaptive command recognition (ACR) system 200 is shown, according to one embodiment. System 200 includes a voice trigger module 202, acoustic engine 204, and adaptive decoder 208. The acoustic engine 204 is shown to use an acoustic model 206. Adaptive decoder 208 is shown to use an adapted language model or an adaptive lexicon in a simple form 210. System 200 is configured receive an input audio stream and output a command phrase identified from the audio stream to an application processor. The various components of system 200 can be implemented as separate or combined configurations of circuit elements or software. In some embodiments, components of ACR system 200 may be implemented by a software application executed by the operating system of the application processor. In some such embodiments, updates to models and components in ACR system 200 may be transmitted from the application processor to the appropriate device responsive to receiving the update from the application software update.

Voice trigger module 202 is configured to recognize a trigger keyword or phrase from the input audio stream. Voice trigger module 202 may also be configured to send a control signal to at least one of the acoustic engine 204 or the adaptive decoder 208 in response to identifying the trigger keyword or phrase. The control signal causes the acoustic engine 204 and/or adaptive decoder 208 to wake up from a sleep-state or low-power state and begin processing the audio signal. In some embodiments, the wake-up signal is configured as a command chaining wake-up, wherein the ACR system remains in an active state for several seconds after a first command is received, such that the user can speak a subsequent command after the first command without having the repeat the trigger keyword. The voice trigger module 202 may provide an anchoring point for the subsequent command phrase in the audio signal. Voice trigger module 202 may be configured to associate a time stamp with the spoken command or otherwise indicate the starting point of the subsequent command phrase to the acoustic engine 204. In some embodiments, the audio stream is stored in a buffer accessible by the voice trigger module 202 and acoustic engine 204. Data from the audio stream may be grouped into finite audio signals to be processed in the ASR system as discrete-time features. In some embodiments, the audio signals overlap in time.

In some embodiments, voice trigger module 202 alternatively or additionally includes a verification module that determines whether a speech utterance is spoken by the user of the system based on the speech signal characteristics in the speech utterance. Speech signal characteristics of the user may be determined such that voice trigger module 202 does not send a control signal when someone other than the user speaks the keyword. Speech signal characteristics of the user may be measured or determined during an initialization phase of ACR system 200. For example, during set up of ACR system 200, the user may be prompted to speak a sample keyword or sample phrase one or more times. The sample keyword may be the trigger keyword, for example. In some embodiments, speech samples during an online phase of ACR system 200 may be used to determine the speech signal characteristics of the user.

Acoustic engine 204 is configured to generate a sequence of graphemes or phonemes from an audio signal. Acoustic engine 204 can retrieve an acoustic model 206 from memory and use the acoustic model 206 to generate the sequence of graphemes or phonemes. Acoustic engine 204 may identify frequency-domain or time-domain features of the acoustic signal. Acoustic engine 204 may alternatively implement the verification module as discussed in regards to trigger module 202 to generate sequences related only to the designated user of the ACR system 200. The input to the acoustic engine 204 includes the audio signal and a starting point in the stream for grapheme or phonetic conversion. In the embodiments of the present application, the acoustic model 206 is a compressed acoustic model. Acoustic model 206 may be compressed according to any compression algorithm, such as, for example, quantization or structural complexity reduction. Acoustic model 206 may be a hard classifier (i.e., outputs the predicted grapheme or phoneme) or a soft classifier (i.e., determines a probability that a particular grapheme or phoneme was spoken). In some embodiments, the acoustic engine 204 implements a probabilistic phase, wherein probabilities for several potential graphemes or phonemes are generated, and a subsequent deterministic phase, wherein one of the several potential graphemes or phonemes are selected for output based on the respective probabilities. Acoustic engine 204 may be configured to send a control signal to adaptive decoder 208 to indicate a grapheme or phoneme sequence is ready to be processed.

Adaptive decoder 208 receives the sequence of graphemes or phonemes from the acoustic engine 204 and determines a command spoken by the user. The adaptive decoder 208 may be configured to receive the output from the acoustic engine 204, and identify the intended command spoken by the user using the adapted lexicon 210 that associates grapheme or phoneme sequences with words, phrases, or commands in a list. Adapted lexicon 210 could be a database of limited command entries, where the command entries have one or more associated grapheme or phoneme sequences and the intended command. In some embodiments, adapted lexicon 210 comprises lexeme entries with a corresponding label, one or more pronunciations stored as grapheme or phoneme sequences, and weighted values associated with the lexeme and/or individual sequences. In some embodiments, the weighted values are indicative of the likelihood a user would speak the given grapheme or phoneme sequence to determine which of several potential lexeme labels the user spoke. The adapted lexicon 210 may incorporate other features of speech processing, such as a compiled dictionary or grammar. Adapted lexicon 210 may be incorporated into a language model, such as a finite-state transducer. In some embodiments, adapted lexicon 210 may be structured as a prefix tree or finite state network. In some embodiments, adaptive decoder implements a Hidden Markov Model (HMM).

The adapted lexicon 210 may be modified or recompiled to recognize additional grapheme sequences. For example, additional lexicon entries may be added to the adapted lexicon 210. The updated lexicon may be used to generate or modify a language model. The additional grapheme sequences may recover from prediction errors from the acoustic engine. The prediction error may be caused by the compression of the acoustic model 206. Model prediction error may be understood to mean misidentifying a grapheme, word, or command from the audio stream. The additional grapheme sequences may be selected to be added to the adapted lexicon 210 based on a measured error rate in training data used to compile adaptive decoder 208.

The adaptive decoder 208 uses the list of commands in the adapted lexicon 210 to limit the commands recognized by adaptive decoder 208 to only those commands relevant to a particular state of the system or context. For example, a device may operate in a locked mode and an unlocked mode, where the system accepts different commands in each mode. In another example, a device responds to a first set of commands while the user is in a home screen; thereafter, when the user launches an application on the device, the device responds to a second set of commands relevant to the application. Adaptive decoder 208 may be recompiled or expanded responsive to a determination of a state or context change. Dynamic command lists generally reduce the memory size of adapted lexicon 210 and adaptive decoder 208.

In some embodiments, the input signal received from the microphone is processed prior to being received by the trigger module 202 and/or acoustic engine 204. Pre-processing may include beamforming, noise cancellation, or noise suppression. For example, pre-processing may include wind noise reduction methods. As will be appreciated, pre-processing may be performed by analog or digital circuit components, filters, modules, or combinations thereof.

Figure 3:
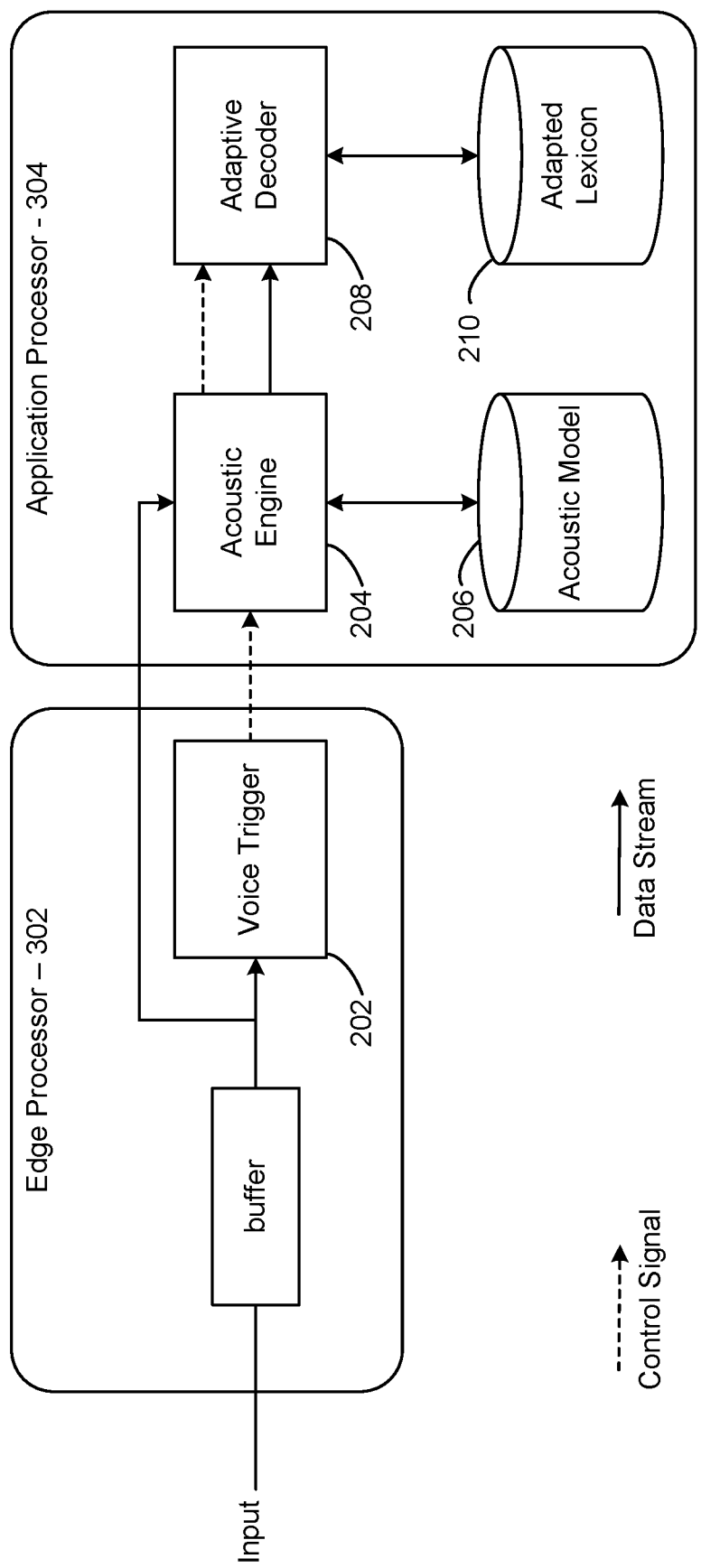
FIGS. 3-6 are configurations of an adaptive speech recognition system, according to some embodiments.

FIGS. 3-6 illustrate various configurations of the ACR system 200 across an edge processor and an application processor. Referring to FIG. 3, edge processor 302 is shown to implement the trigger module 202 while application processor 304 implements the acoustic engine 204 and adaptive decoder 208. The edge processor 302 may be configured to receive the input audio stream, recognize a chosen trigger phrase, and send a control signal to the application processor 304 with an indication of a start of a potential command. Application processor 304 may then analyze the audio stream and identify the spoken command.

Figure 4:
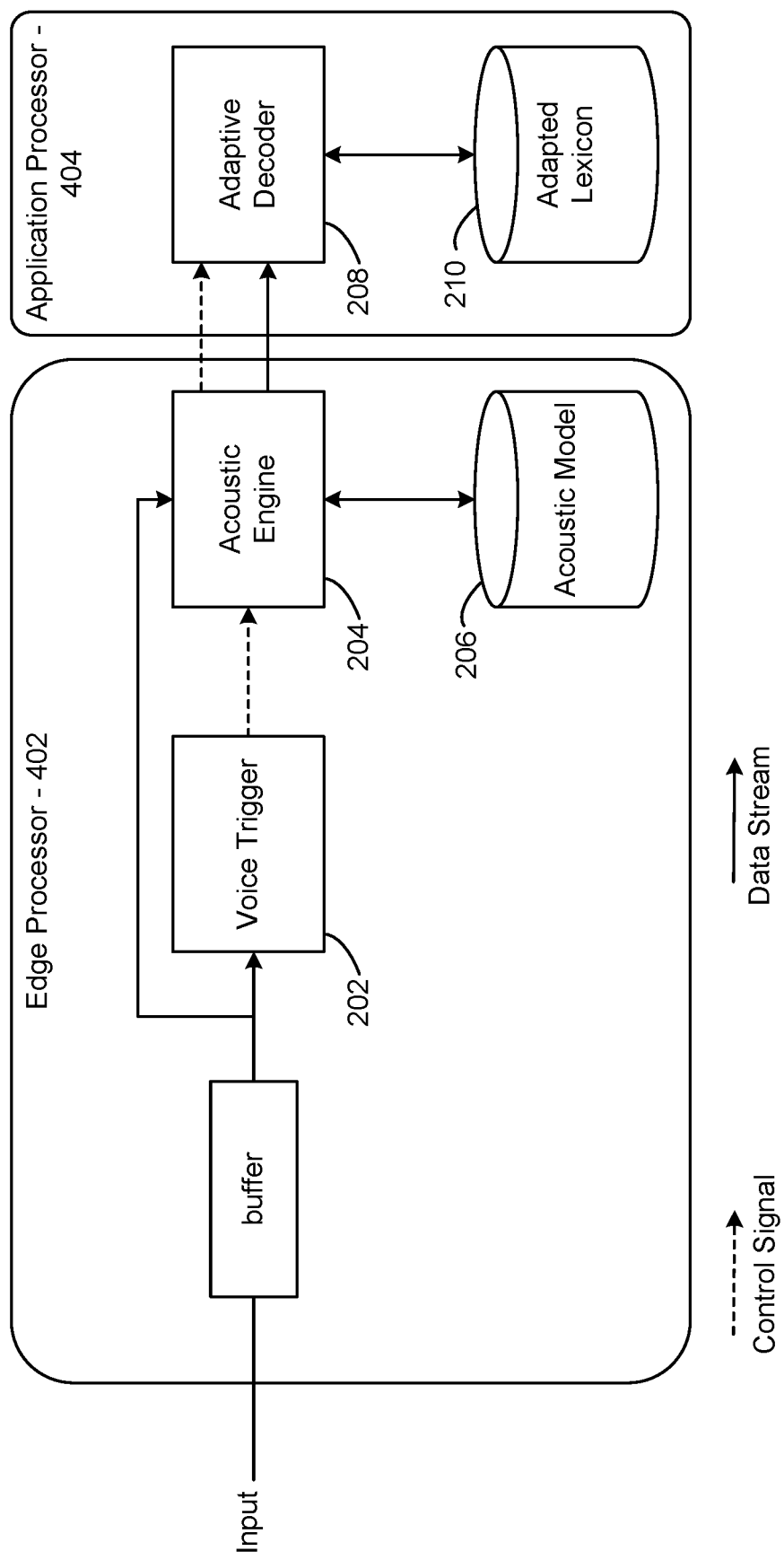

Referring to FIG. 4, edge processor 402 is shown to include both the trigger module 202 and the acoustic engine 204, and application processor 404 implements the adaptive decoder 208. Edge processor 402 may be configured to receive an input audio stream, identify a trigger phrase, and generate a sequence of graphemes from the input audio stream. The edge processor 402 may send the grapheme sequence to the application processor 404, where the application processor 404 determines the intended command from the grapheme sequence.

Figure 5:
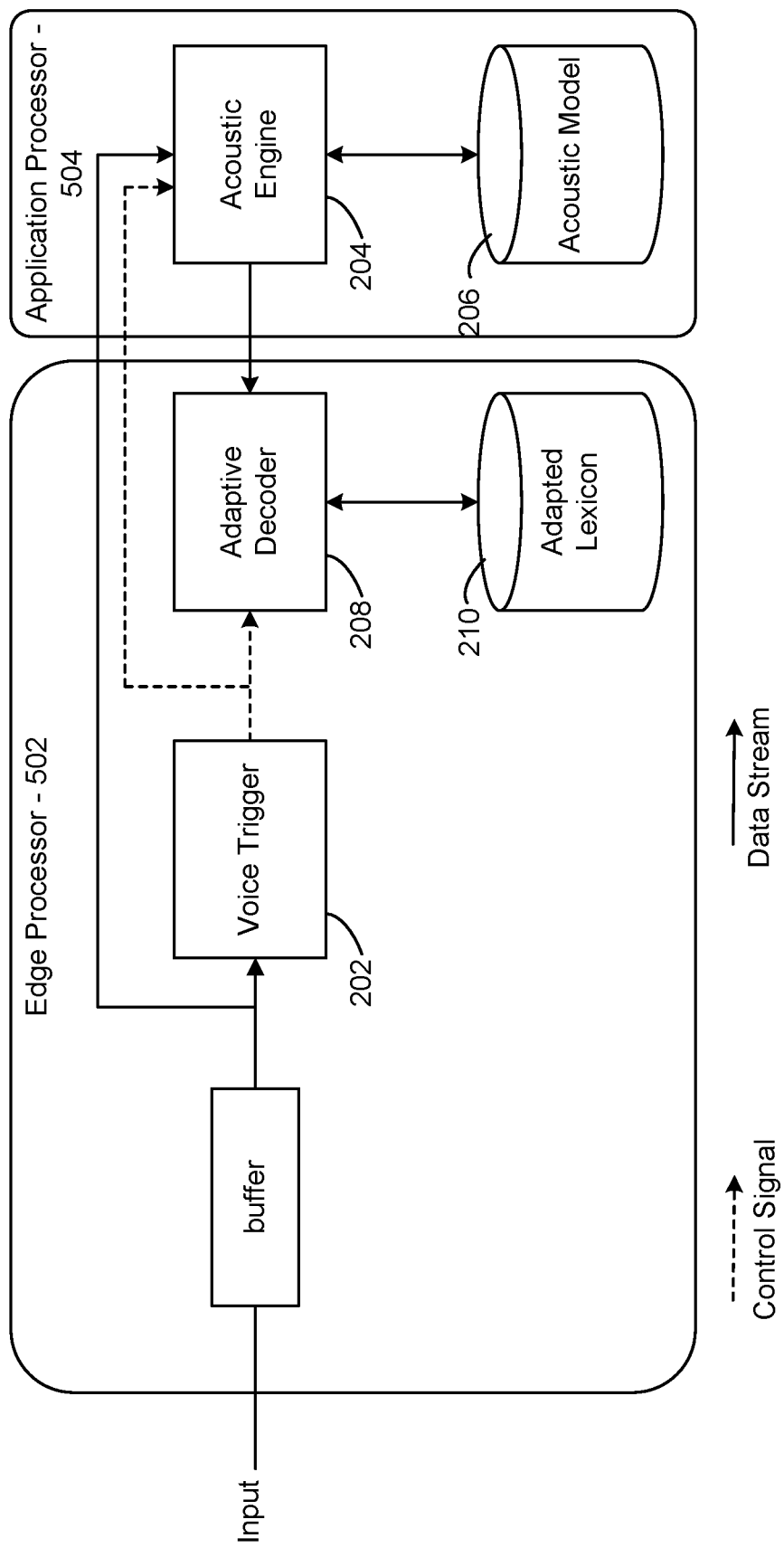

Referring to FIG. 5, an embodiment is shown where edge processor 502 includes the trigger module 202 and the adaptive decoder 208, and application processor 504 implements the acoustic engine 204. The edge processor 502 may be configured to receive the input audio stream and identify a trigger phrase from the audio stream. The edge processor 502 may be configured to send a control signal to application processor 504 initiating processing of the audio stream by the application processor 504 and a start point of the potential command. Application processor 504 may be configured to generate a sequence of graphemes based on the audio stream and send the grapheme sequence to edge processor 502. Edge processor 502 may be further configured to determine an intended command from the sequence of graphemes and send the intended command to application processor 504.

Figure 6:
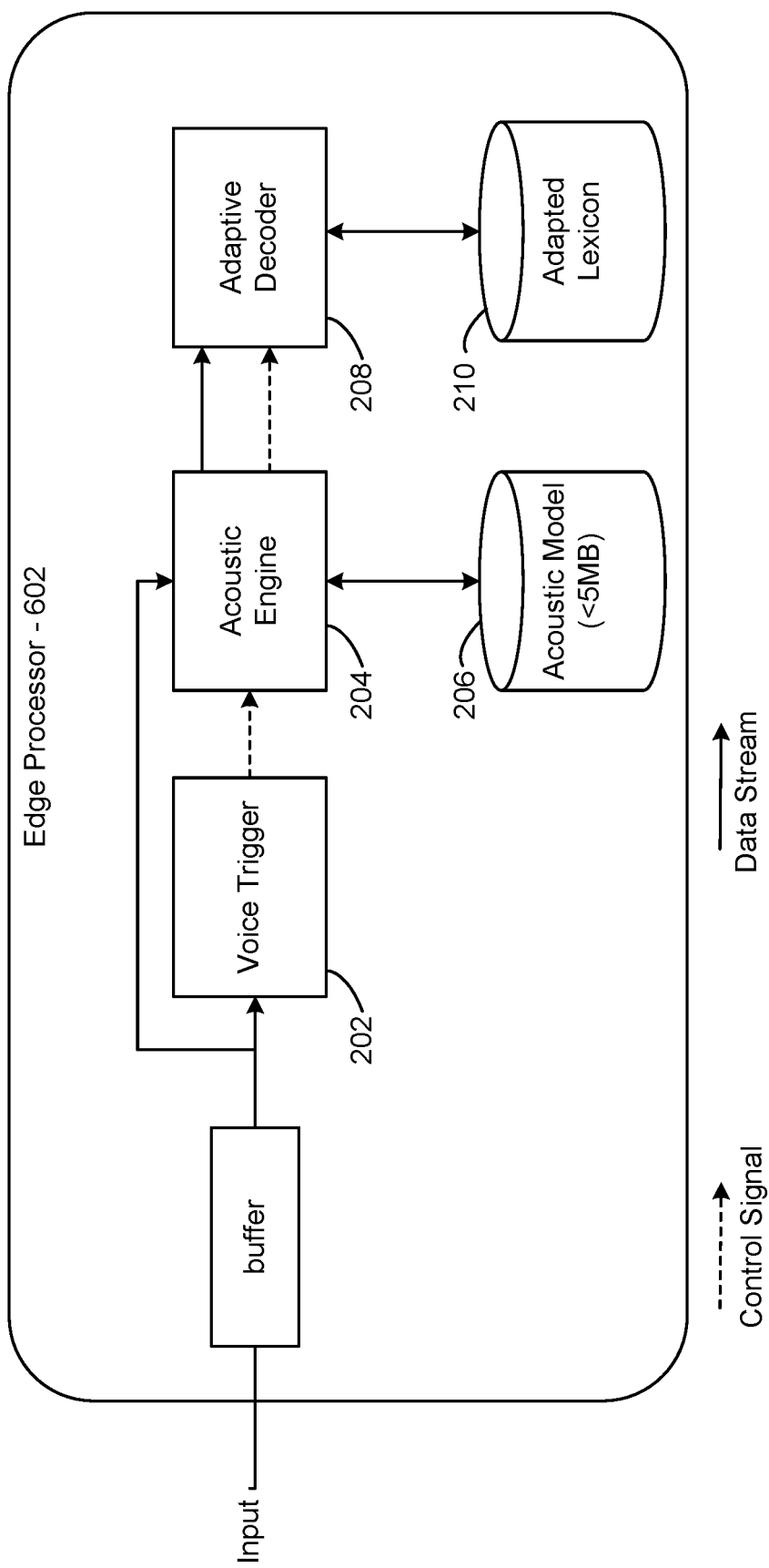

Referring to FIG. 6, an embodiment is shown where edge processor 602 includes the trigger module 202, the acoustic engine 204, and the adaptive decoder 208. Thus, edge processor 602 performs full ASR processing for the input audio stream and sends the command to an application processor. Edge processor 602 may still be configured to communicate identified commands with an application processor (not shown).

Any of the application processors 304, 404, or 504, or any of edge processors 302, 402, 502, or 602 may be configured to execute a response to the identified command. In some embodiments, the application processor or edge processor are configured to send a control signal to another device in the device or system.

ASR Management System

Figure 7:
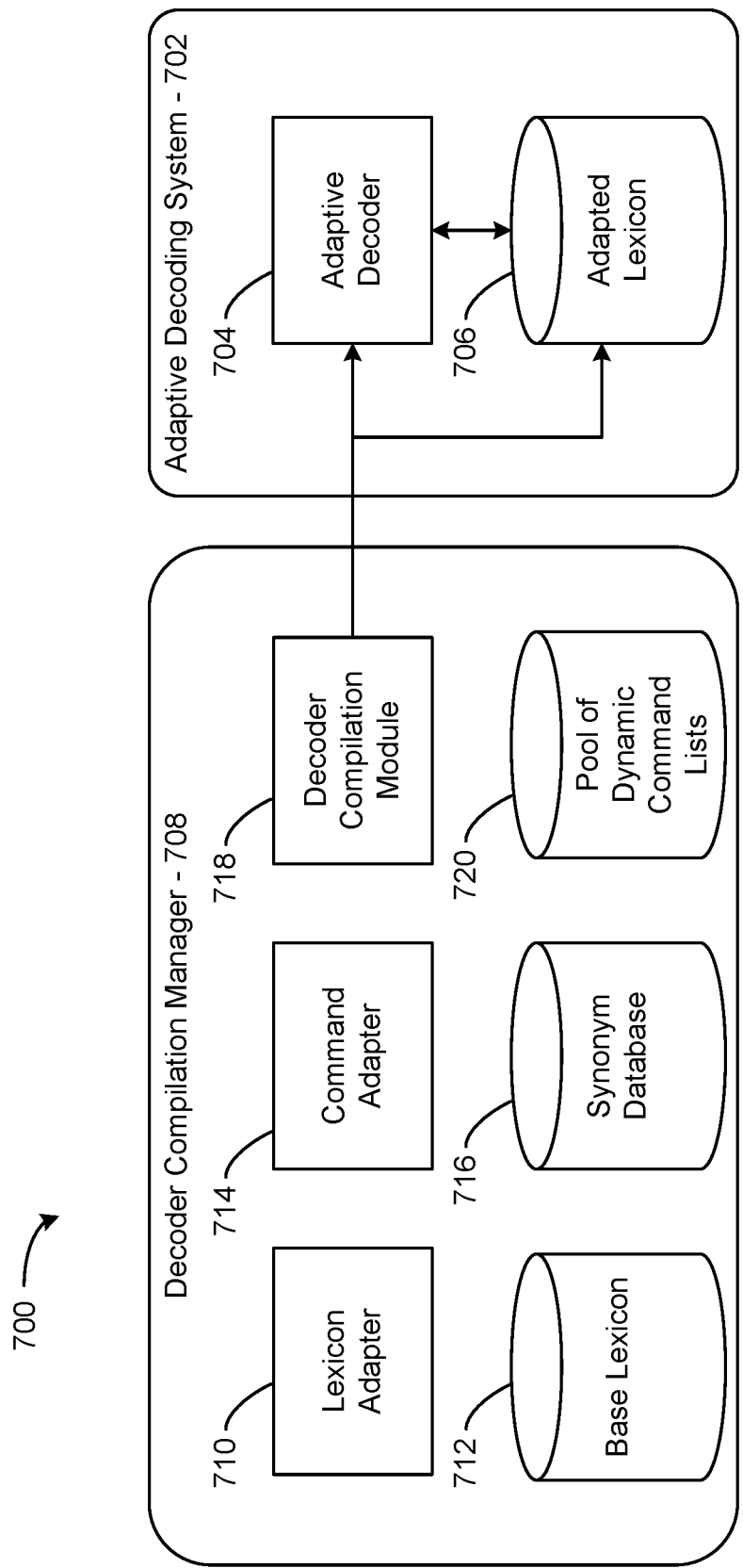
FIG. 7 is a diagram of a system for automatically constructing an adaptive decoder for a speech recognition system, according to some embodiments.

Referring now to FIG. 7, a decoder management system 700 is shown, according to one embodiment. System 700 is shown to include an adaptive decoding system 702 and a decoder compilation manager 708. Adaptive decoding system 702 can include any component, feature, or configuration as discussed in relation to the ACR system 200. Decoder compilation manager 708 includes a lexicon adapter 710, base lexicon 712, command adapter 714, synonym database 716, decoder compilation module 718 (also referred to herein as decoder compiler), and a database 720 of one or more dynamic command lists. Decoder compilation manager 708 is configured to select a dynamic command list from database 720 based on the state or context of the application device/system, generate an adapted lexicon 706, and send the adapted lexicon 706 to the adaptive decoding system 702 to be used by an adaptive decoder 704 in ASR processing. In some embodiments, the adapted lexicon 706 is compiled and sent as a adapted language model (LM) based on the selected command list.

Decoder compilation manager 708 is configured to regulate updates or expansions of the adapted lexicon 706. Decoder compilation manager 708 may be configured to receive an indication of a change in state or context of a supported system from the application device. Decoder compilation manager 708 may send control signals to adaptive decoding system 702 indicating the adaptive decoder 704 should be updated. Decoder compilation manager 708 may be configured to receive sample speech data or prompt a user to speech a sample command. Decoder compilation manager 708 may then use the sample speech data to update base lexicon 712 or adapted lexicon 706. Decoder compilation manager 708 may also interface with a network interface to send and receive data with network devices, and/or a user interface to display data to a user and receive user input for control of the ASR system Decoder compilation manager 708 may generally operate on an application processor, and adaptive decoding system 702 can be distributed across the application processor and/or an edge processor. The components of decoder compilation manager 708 may be implemented using one or more software algorithms, hardware circuits, or combinations thereof. For example, decoder compilation manager 708 may be implemented by a processing circuit of the application processor 108, wherein the components of decoder compilation manager 708 are stored as software elements in a memory storage device, and when executed by one or more processors of the processing circuit, cause the processor to execute the detailed functions and features. Other implementations and configurations of decoder compilation manager 708 should also be appreciated.

In some embodiments, decoder compilation manager 708 is configured within a user device, such as a mobile device executing a software application associated with adaptive decoding system 702, such as one discussed in relation to application processor 108 and user interface 110. The decoder compilation manager 708 may be coupled to a network interface of the device, such that the decoder compilation manager 708 can retrieve data over a connected network (e.g., local network, the internet) including downloading of updated software and repositories. For example, features of the ASR system and/or decoder compilation manager 708 may be implemented by a software application downloadable from an online marketplace, where updated versions of models, lexicon, dictionaries, synonyms, grammars, or other relevant data may be retrieved via updates to the software application. As another example, the decoder compilation manager 708 may be enable via the network interface to retrieve and download lexicons, grammars, synonyms, dictionaries, or other relevant data from an online server.

With continued reference to FIG. 7, decoder compiler 718 is configured to compile the adaptive decoder 704 with the adapted lexicon 706. The adapted lexicon 706 may be compiled by decoder compiler 718 with a subset of base lexicon 712 to meet a memory constraint. Decoder compiler 718 may be configured to retrieve a subset of commands to be included in the adapted lexicon 706 from dynamic command list database 720 based on a particular context or state of the device. Further still, the decoder compiler 718 may utilize a dictionary to convert phrases or commands in the dynamic command list database 720 to grapheme or phoneme sequences. For example, if the user adds a new contact to their contact list, a trained conversional model, such as a Long Short-Term Model (LSTM) or transformer, may be used to generate a grapheme sequence of the new contact name. Decoder compiler 718 may be configured to include the additional grapheme pronunciations added to the base lexicon 712 in the adapted lexicon 706 from lexicon adapter 710. Decoder compiler 718 may be configured to generate an adapted language model using adapted lexicon 706 implemented by the adaptive decoder 704. The resulting language model may be configured in the form of a finite state transducer or weighted graph, for example.

Decoder compiler 718 may be caused to recompile the adaptive decoder and/or adapted lexicon 706 based on a received control signal. The control signal may be indicative of a changed state of the application device, an additional or alternate command to be included in the adaptive decoder 704, a software update to a corresponding software application, or any other trigger event as discussed herein. For example, the decoder compiler 718 may be triggered by a particular application, such as a contact list, to update or recompile a dynamic command list when the user made a change to the contact list in the phone contact application. In a synchronized realization, the changes in an application associated with the dynamic command system may immediately trigger the recompilation of the adaptive decoder 704. In other embodiments, such changes trigger the recompilation periodically.

Database 720 of dynamic command lists may be configured such that each dynamic command list comprises one or more commands adapted to or relevant to a particular context. The command list may be dynamic in that commands can be added and removed from the command list. The command lists may be stored in memory corresponding to database 716 in association with a context identifier. For example, a first command list may be associated with a first third-party app downloadable to a user's mobile device (e.g., a calendar app), and a second command list may be associated with a second app (e.g., a navigation app) on the mobile device, wherein commands associated with the first app are not necessary or applicable when the application device is executing the second app, and vice versa. In some embodiments, a command list may be associated with a home screen or default mode of the application device. In some embodiments, a command list is made generic in that the commands in the generic command list are recognizable regardless of the context or state of the device. Dynamic commands may be statically set or parameterized. In some embodiments, a dynamic command may be formatted in JSON as:

{"DynCommand":CommandExpression,"action":
"app.Func", "parameters":[parameter:$value(,parameter:$value)*]} where "DynCommand," "action," and "parameters" are field names for the definition, CommandExpression is the phrase the user speaks, app.Func is the corresponding function call of the application device, and parameters are dynamic values from the command expression that are input into the function call. As an example, for the command "set my alarm for 6 am", the command may be structured in memory in the form:

{"DynCommand":"setmyalarmfor$time","action":
"alarm.setTime", "parameters":["startTime":$time]} where alarm.setTime is a function associated with the application device or particular software application, and $time is a parameter value dynamically set depending on what time is spoken (e.g., "6 am").

In some embodiments, the definition for parametrized variables may be given or adjusted using a grammar, statistical model (e.g., finite state transducer, n-gram model, or neural network), or function call. For example, a domain-general or well-defined expression, such as a date, may be input into a grammar model to translate a spoken date into a standard format. In another example, a statistical model may be defined to evaluate the various formats of currency that may be spoken by the user. In yet another embodiment, a separate function call may be executed, such as a getContactList to retrieve and compare names in a user's contact list to a spoken name.

Lexicon adapter 710 generally updates or expands the base lexicon 712 for use in the adapted lexicon 706. The base lexicon 712 can be a generic or sophisticated lexicon comprising lexeme entries corresponding to a word, phrase, or grammar rule with associated grapheme pronunciations.

The adapted lexicon 706 may be a subset of base lexicon 712 and may include additional or alternative grapheme or phoneme sequences. Base lexicon 712 may be retrieved from a database in a network. In some embodiments, base lexicon 712 is stored on the application processor and the adapted lexicon 706 is stored on an edge processor. In other embodiments, the adapted lexicon 706 is also stored on the application processor. Lexicon adapter 710 can add and remove lexemes or pronunciations to the base lexicon 712 and/or adapted lexicon 706. Base lexicon 712 or adapted lexicon 706 may be expanded to include recovered or non-standard grapheme sequences generated by a compressed acoustic model. Base lexicon 712 or adapted lexicon 706 may also be expanded to recognize user-specific grapheme or phoneme pronunciations. Lexicon adapter 710 may be configured to generate and update a confusion matrix to measure the error rate of grapheme or phoneme sequences of labelled speech samples to determine which grapheme or phone sequences to add to the lexicon. In addition, lexicon adapter 710 may be configured to adjust the weights of lexeme entries in the lexicon based on the lexicon expansion. Lexicon adapter 710 may also be configured to send a control signal to decoder compiler 718 responsive to expanding the lexicon, such that the decoder compiler 718 is caused to recompile the adaptive decoder 704. In some embodiments, the system 700 is configured such that when a new command is received for inclusion in a dynamic command list, the decoder compiler 718 and/or the lexicon adapter 710 may determine a degree of confusion of the new command against commands in the command list and automatically determine alternative synonyms of a term or phrase for the new command.

Command adapter 714 is configured to replace, update, and/or expand commands compiled into adapted lexicon 706. Command adapter 714 may be configured to determine a confusability metric between two or more commands in the base lexicon 712 or adapted lexicon 706, determine one or more alternate commands corresponding to the two or more commands, and replace a designated confusable command of the two or more confusable commands in the adapted lexicon 706 with a designated alternate command. In some embodiments, command adapter 714 replaces commands in a particular dynamic command list in database 716, and subsequent sends a control signal to the decoder compiler 718 to recompile the adaptive decoder 704 or adaptive decoder 706 with the updated command list. In some embodiments, command adapter 714 replaces commands in one or more command lists in database 716 comprising the command to be replaced. In some embodiments, command adapter 714 sends a signal to lexicon adapter 710 to remove or replace a command in the base lexicon 712. In other embodiments, command adapter 714 sends a signal to decoder compiler 718 to recompile the adaptive decoder 704 or adapted lexicon 706 to replace one or more commands in the adapted lexicon 706 with one or more alternate commands. Command adapter 714 may also include additional components or algorithms to determine appropriate alternate commands, such as identifying a word or phrase within a confusable command that is eligible to be replaced by an equivalent word or phrase, or determining which word or phrase is the most effective or desired to be replaced in a confusable command. In some embodiments, command adapter 714 is configured to record selected alternate commands such that future compilations of the adapted lexicon 706 or adaptive decoder 704 incorporate the replacement automatically.

Synonym database 716 comprises alternate commands stored in association with a semantically equivalent command or commands. Synonym database 716 may be configured as a thesaurus, action ontology, or a combination thereof. For example, a thesaurus may be configured as a list of words or phrases with similar meaning to a first word or phrase, such as the phrase "turn on" being stored in association with the words "switch on," and "activate." The synonym database 716 may also include weights associated with each entry, such that the command adapter 714 may choose which substitute word or phrase to include in the alternate command. For example, each entry in the synonym database 716 may have a weighted value against the alternate substitutions, such that the command adapter 714 can stochastically select the substitution based on the weights. In another example, the synonym database 716 uses weighted values to indicate a hierarchical order of substitution options, such that the command adapter 714 tests a first substitution to determine if the confusability is acceptable, and if not, tests a second substitution, and so on until an acceptable substitution is determined. In some embodiments, the synonyms in the synonym database 716 may comprise word or phrase expansions, such as expanding the command "call $name" to "make a phone call to $name."

In some embodiments, at least some of the components of decoder compilation manager 708 are performed by a processing device remote to application processor 108 and edge processor 106. For example, lexicon adapter 710 and/or command adapter 714 may be executed by a language model specialist to develop base lexicon 712 and/or database 720 with expanded entries and replacement of alternate commands, respectively. The updated models, lexicons, or command lists may be sent to the decoder compilation manager 708 via an update to a software application running on the application processor. Such embodiments would reduce the computational and memory burden on the application processor while still providing for confusion reduction of the ASR system.

In some embodiments, the user may be able to manage and review the sets of dynamic commands via a software application associated with the ASR system downloaded to a device associated with the user. For example, the software application may cause the device to display a GUI with a list of the context-specific command lists, where a user can see which commands are recognized by each respective command list. The user may then be able to add, remove, or replace commands in dynamic command lists via the user interface.

Figure 8:
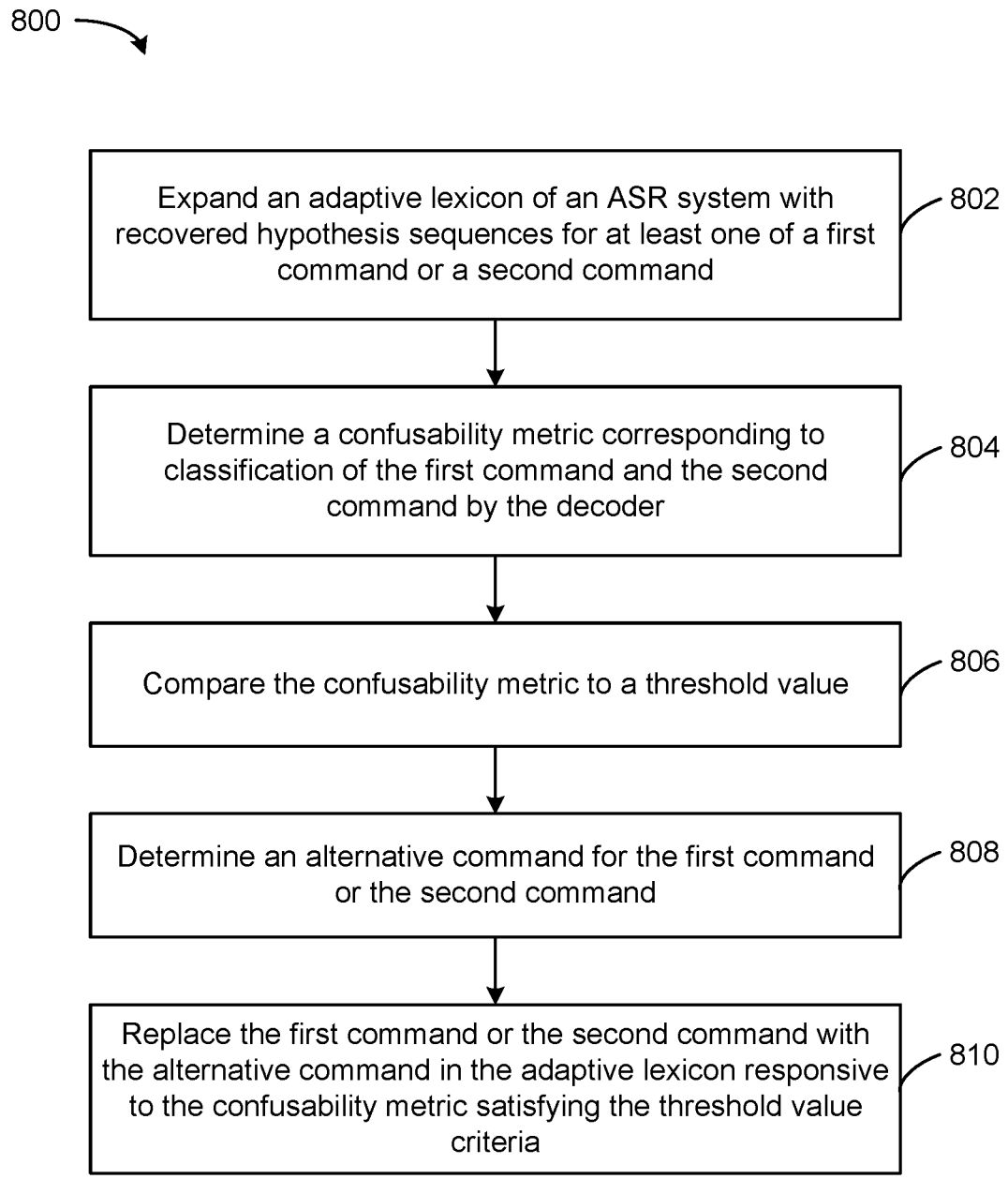
FIG. 8 is a flow diagram of a method for reducing confusability of confusable commands in an adaptive decoder, according to some embodiments.

Referring now to FIG. 8, a method 800 for reducing confusability of commands in an adapted lexicon is shown. In some embodiments, method 800 may be executed by decoder compilation manager 708 and/or one or more processing circuits of application processor 108. The method 800 generally expands an adapted lexicon with recovered grapheme or phoneme sequences based on a compressed acoustic model, and subsequently replaces commands in the adapted lexicon with high degrees of confusability. The confusion of commands in the adapted lexicon may be resultant of the lexicon expansion or by nature of the compression of the acoustic model. Although shown with a first command and a second command, method 800 may be applied for more than two confusable commands, and may be repeated multiple times until a cumulative error rate for all commands reaches an acceptable state or steady state.

In 802, the adapted lexicon is expanded to include additional grapheme or phoneme sequences corresponding to a first command or a second command represented in the adapted lexicon. Recovered sequences may refer to sequences comprising graphemes or phonemes considered by the acoustic engine during a probabilistic phase, but were not produced as the predicted grapheme or phoneme during a deterministic prediction phase. Thus, the grapheme or phoneme sequence is recovered in that the correct sequence was recovered from the acoustic engine based on the corresponding label of a labelled speech sample. Embodiments corresponding to step 802 are further detailed in FIGS. 9A and 9B. In some embodiments of method 800, step 802 is optional.

In 804, a confusability metric is determined that corresponds to an error rate in classifying speech samples as the first command or the second command. In some embodiments, the confusability metric is a probability that speech sample corresponding to the first command is classified as the second command, or vice versa. In some embodiments, the confusability metric is a cumulative measure of an n-gram error rate of n-gram components of the first command and the second command. In some embodiments, the confusability metric is a quantitative comparison of the grapheme or phoneme sequences of the first command and second command, such as, for example, a percentage of comparing the similarity between the sequences of the first command and the second command. In some embodiments, the confusability metric is a quantitative measure of the number of times the first command or the second command were mistakenly classified as the other, or a cumulative measure combining the number of false positives of both commands. In some embodiments, the confusability metric is based on the weighted values of lexeme entries or pronunciations in the adapted lexicon, such as, for example, the difference between a weighted value of the first command a weighted value of the second command. Other measures of confusability may be appreciated for step 804. Determination of confusable commands is further described in relation to FIGS. 10A and 10B.

In 806, the confusability metric is compared to a threshold criterion. In some embodiments, the threshold criterion is a threshold value defining a maximum accepted error rate and satisfying the threshold criterion includes the confusability metric exceeding the threshold value. In some embodiments, the threshold criterion is a threshold value defining a minimum accepted accuracy rate, and satisfying the threshold criterion includes the confusability metric falling below the threshold value. In some embodiments, the threshold criterion is a threshold value defining the number of times the first command and the second command triggered false positives, and satisfying the threshold criterion includes exceeding the threshold value. In some embodiments, the threshold criterion is a similarity measurement of weighted values of lexeme entries of the first command and second command exceeding a threshold value. Other threshold criteria may be appreciated for step 806. Responsive to a determination that the confusability metric satisfies the threshold criterion, steps 808 and 810 may be executed to replace one of the first command and second command with a less confusable substitute.

In 808, an alternate command corresponding to the first command or the second command is determined. In some embodiments, the alternate command may be retrieved from synonym and ontology-grouping data stored on a processing device or from a networked device. The alternate command may also be generated by substitution of a single word or phrase with a different word or phrase. In some embodiments, determining the alternate command is based on providing a user display to a user via a user interface and receiving a selection of a single alternate command. In some embodiments, one or more alternate commands are determined for the first command and one or more alternate commands are determined for the second command, and the single alternate command is determined based on a comparison of the potential substitutions. In some embodiments, a single command is selected for replacement from the group consisting of the first command and the second command, and subsequently one or more alternate commands are determined for the single selected command as potential substitutes. Selection of the single alternate command from a plurality of potential alternate commands may be based on weighted values associated with the retrieved or generated alternate commands, where the weighted values are based on perceived effectiveness in reducing confusion or by user preference. Further embodiments of step 808 are detailed in discussion of FIG. 11.

In 810, the first command or the second command is replaced in the adapted lexicon by the alternate command. The alternate command may generally be associated with one of either the first command or the second command. Replacement of the one of the first command or the second command may include removing the one of the first command or the second command from a lexicon used by an adaptive decoder and/or removing the one of the first command or the second command from a dynamic command list. Replacement may also include adding the alternate command to the lexicon and/or the dynamic command list. In some embodiments, the one of the first command or the second command is replaced by the alternate command in a base lexicon and/or a pool of dynamic command lists, and a control signal is sent to a compiler to recompile the adaptive decoder and/or an adapted lexicon with the updated command.

As an illustrative example, an acoustic model may be compressed to fit to a particular hardware constraint for an ASR system on a mobile device paired with smart earbud speakers. An adaptive decoder in the ASR system may be compiled to recognize commands from outputted grapheme or phoneme sequences of the compressed acoustic engine. The adaptive decoder may be configured to recognize both the command "open Yelp" and "Open Uber." However, due to the compression of the acoustic model and/or adaption of the lexicon, the two commands may be confused for each other by the decoder. Alternate commands may then be determined, such as replacing "Open Yelp" with "start the Yelp app" or replacing "Open Uber" with "Open Uber ride sharing." One of the alternate commands is selected, either by the mobile device or by the user. The selected alternate command then replaces the respective command in the adapted lexicon such that the adaptive decoder can more accurately determine the intended command by further distinguishing the phonetic characteristics of the two commands.

Figure 9A:
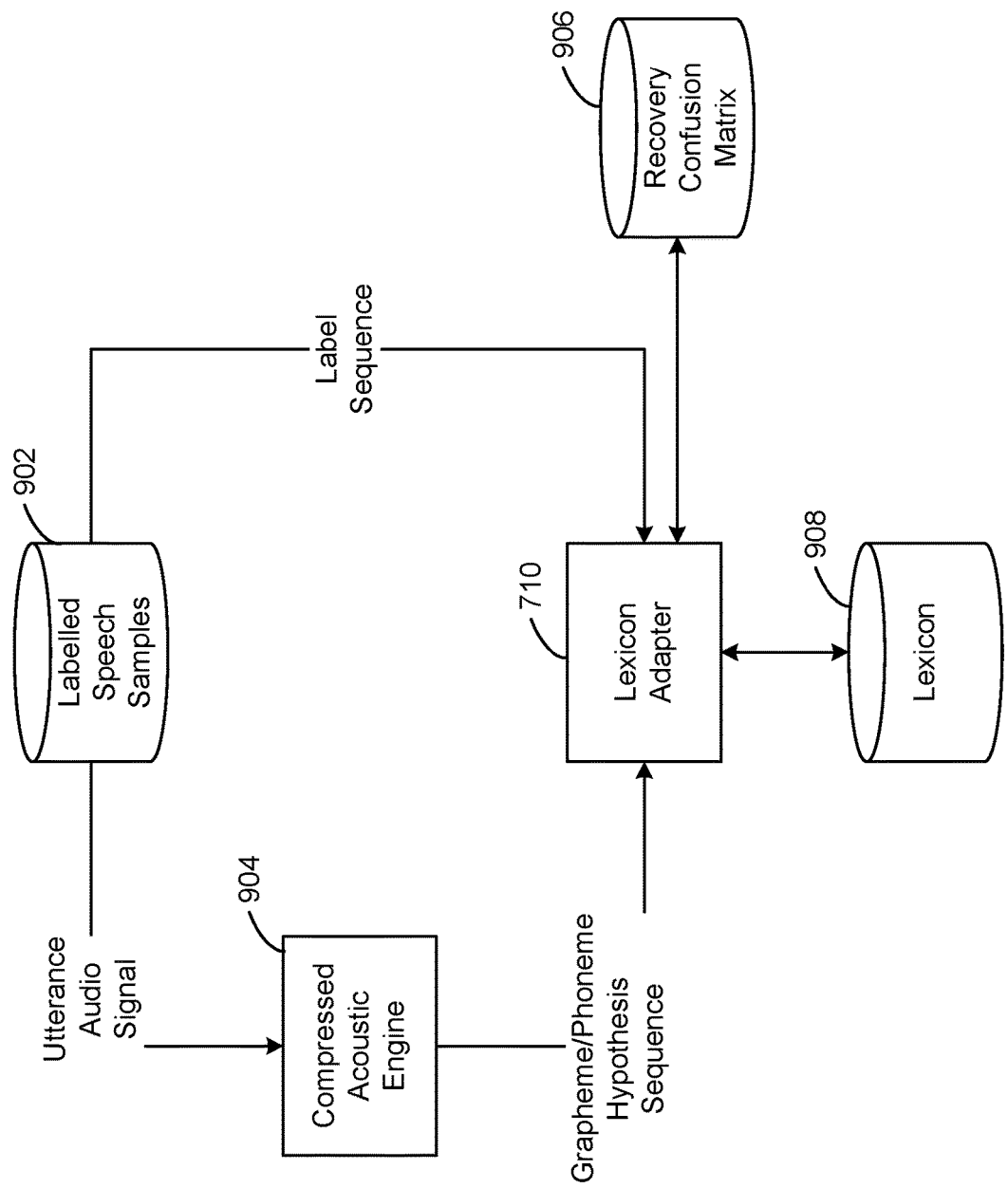
FIG. 9A a diagram of a training system for expanding an adaptive decoder, according to some embodiments.
Figure 9B:
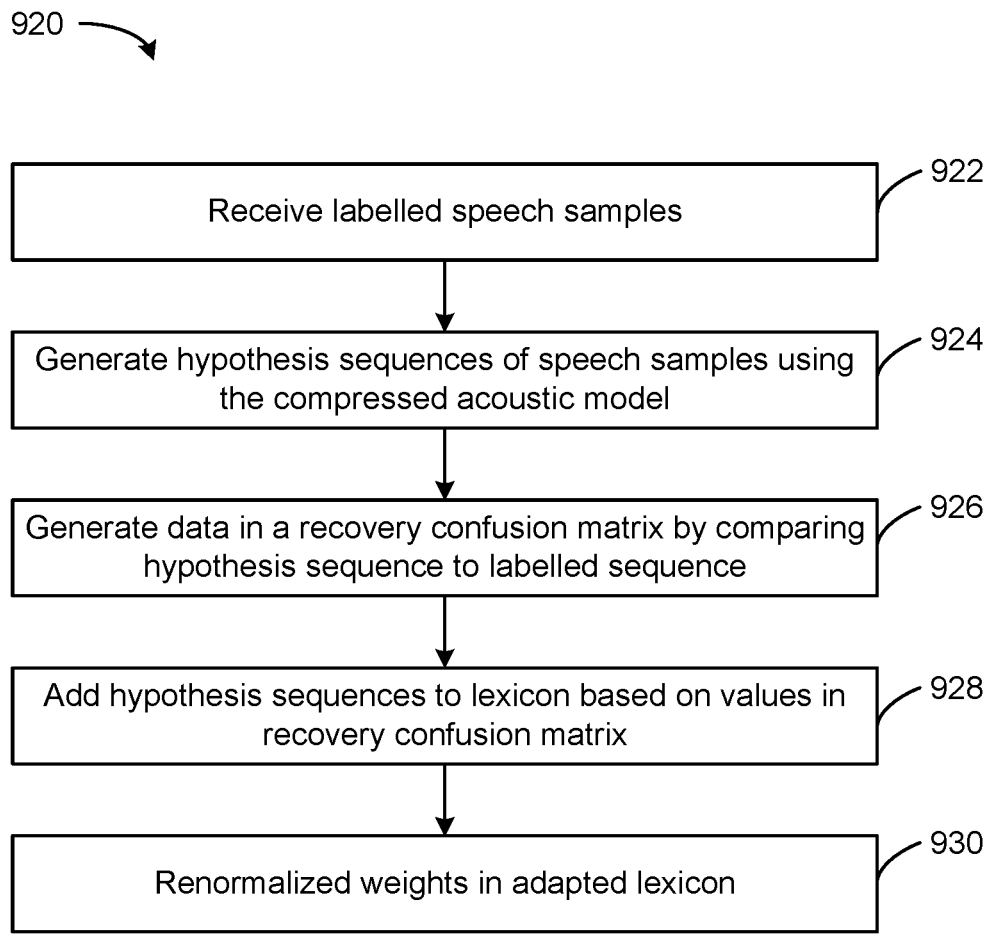
FIG. 9B is a flow diagram for a method of adaptively expanding a speech lexicon based on a compressed acoustic engine, according to some embodiments.

Referring now to FIGS. 9A and 9B, a block diagram and method are shown for expanding a lexicon 908, according to one embodiment. The lexicon 908 is expanded such that recovered or non-standard grapheme hypothesis sequences generated by an acoustic engine 904 implementing a compressed acoustic model are associated with the intended command. The expansion of the lexicon 908 may be based on either grapheme or phoneme hypothesis sequences and to incorporate the additional grapheme or phoneme sequences, respectively, in the lexicon 908.

Referring to FIG. 9A, a block diagram is shown for expanding lexicon 908. The lexicon 908 may be base lexicon 712, adapted lexicon 706, or another lexicon.

Labelled speech samples 902 generally comprise an audio signal with a corresponding label, which may be a grapheme or phoneme sequence of a spoken command or phrase in the audio sample or a command label indicating the spoken command. Labelled speech samples 902 may be retrieved from a database, stored responsive to live operation of an ASR system, or generated responsive to prompting a user to speak a particular command or phrase via a user interface. The audio signals of the labelled speech samples 902 are used as input to the acoustic engine 904 to produce a hypothesis grapheme or phoneme sequence. As a result, this kind of lexicon expansion and adaptation is dependent on a particular acoustic model compressed for a particular memory footprint requirement, and the resulting lexicon may be thus considered an acoustic-model-dependent lexicon.

Lexicon adapter 710 receives the hypothesis sequences from the acoustic engine 904 and compares one or more hypothesis sequences to one grapheme or phoneme sequence associated with the command in the lexicon 908 corresponding to the command label of the labelled speech samples 902. Lexicon adapter 710 may be configured to generate and update a recovery confusion matrix 906 to measure error rates of the acoustic engine over the set of speech samples. Recovery confusion matrix 906 may be updated based on the comparison of the hypothesis sequences to the reference grapheme sequence. Lexicon adapter 710 updates or expands the lexicon 908. Lexicon adapter 710 may include additional grapheme or phoneme sequences to the entries in lexicon 908 based on the recovery confusion matrix 906. In some embodiments, lexicon adapter 710 updates a language model of lexicon 908.

Referring now to FIG. 9B, a method 920 for expanding an adaptive decoder is shown, according to some embodiments. Method 920 may be implemented by decoder compilation manager 708 as shown by the block diagram in FIG. 9A. Method 920 generally expands the adaptive decoder to recognize additional grapheme or phoneme sequences as spoken commands. In some embodiments, the steps of method 920 are performed by decoder compilation manager 708 and adaptive decoding system 702.

At 922, labelled speech samples are received by a system expanding the adaptive decoder. Labelled speech samples generally comprise an audio signal with a spoken command or phrase and a command label indicating the spoken command. The command label may be a grapheme or phoneme sequence and an indication of the intended command. Labelled speech samples may be retrieved from a database, stored responsive to live operation of an ASR system, or generated responsive to prompting a user to speak a particular command or phrase.

At 924, hypothesis grapheme or phoneme sequences are generated for the labelled speech samples using an acoustic engine with a compressed acoustic model. In some embodiments, the audio signal of the labelled speech samples is sent to an acoustic engine configured with the compressed acoustic model to generate the hypothesis grapheme or phoneme sequences. In some embodiments, the hypothesis sequences are sent to a decoder with a wide coverage language model to generated hypotheses.

At 926, model error data is generated by comparing the hypothesis sequences to the reference sequences in the labelled speech samples. Model error data may be generated over the entire sample data set. In some embodiments, the model error data is a prediction accuracy rate of the compressed acoustic model for the sample data set. In some embodiments, the model error data forms entries in a confusion matrix, wherein entries are entered in the confusion matrix based on the hypothesis sequences and reference sequences of the corresponding commands.

At 928, the adaptive decoder is expanded to more accurately recognize the speech samples that the original acoustic model recognizes with high error rate based on the confusion matrix. In some embodiments, the adaptive decoder is expanded based on hypothesis sequences with the highest value in matching the reference sequences as indicated in the confusion matrix of the model error data. In some embodiments, the most commonly-used grapheme or phoneme sequences are used to expand the adaptive decoder. In some embodiments, the model error data is compared to a chosen threshold value, and hypothesis sequences with a model error value greater than the chosen threshold are added to the adaptive decoder responsive to the model error value exceeding the threshold value. A lexicon of the adaptive decoder may be updated or expanded. In some embodiments, a language model is recompiled to expand the adaptive decoder. The adaptive decoder may be expanded responsive to individual data samples or collectively responsive to the entire sample data set being processed.

At 930, weighted values of the adapted lexicon are renormalized based on the addition of the hypothesis sequences. Weighted values may be stored in association with grapheme or phoneme sequences of each lexeme entry in the adapted lexicon. The weighted values may be indicative of the likelihood or probability that the acoustic engine will produce the particular sequence for the spoken word or phrase of the lexeme. In some embodiments, the weighted values are renormalized such that the weights for each lexeme are adjusted to sum to the value of one. In some embodiments, weighted values are assigned to each lexeme entry indicative of the likelihood the lexeme word or phrase is to be present in a speech sample. Renormalizing the weighted values at 930 may be based on the error rate of the acoustic engine to increase weighted values of sequences added to the adapted lexicon. The renormalized adapted lexicon may then be recompiled for the adaptive decoder. In some embodiments, entries or pronunciations with weighted values less than a threshold value are removed from the adapted lexicon before or after renormalization.

In some embodiments, the method 920 is repeated multiple times until the weighted values and error rates reach a steady state. The same or new speech samples may be input into the acoustic engine to incorporate additional hypothesis sequences recovered. In some embodiments of method 920, the user is prompted to speak one or more sample commands for processing by the adaptive ASR system. Audio signals of the sample command can be stored with an associated command label. Such embodiments provide the advantage to incorporate user-specific pronunciations in decoder adaption. In some embodiments, during operation of the adaptive ASR system, when two or more potential grapheme or phoneme sequences have a similar probability, the user may be prompted to select which of two potential commands was actually spoken. An audio signal of the ambiguous spoken command may be stored as a speech sample with a command label that was indicated by the user. Accordingly, the ambiguous speech sample may be used to further refine and expand the adaptive ASR system.

Figure 10A:
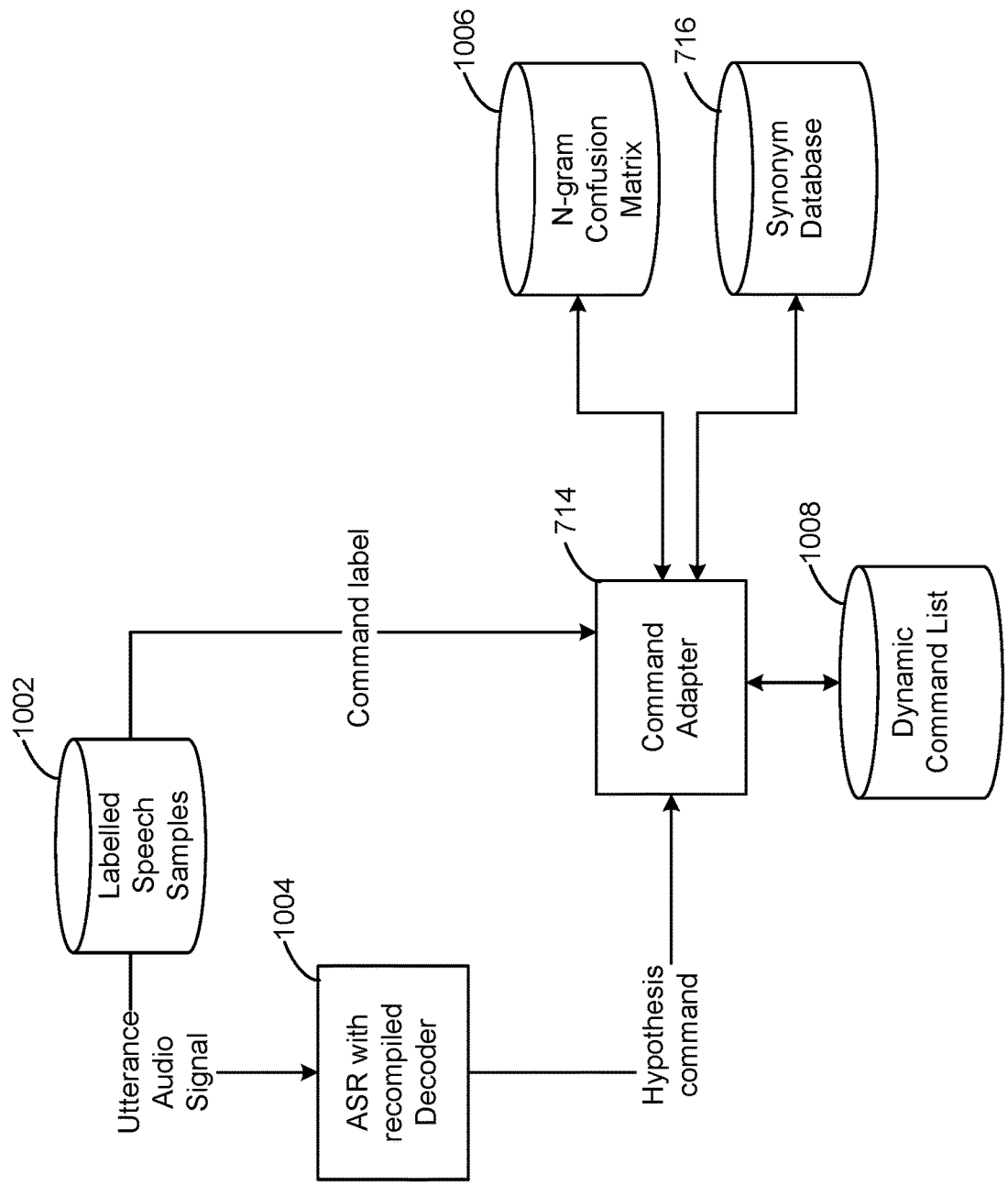
FIG. 10A is a diagram of a training system for reducing confusability in an adaptive decoder, according to some embodiments.
Figure 10B:
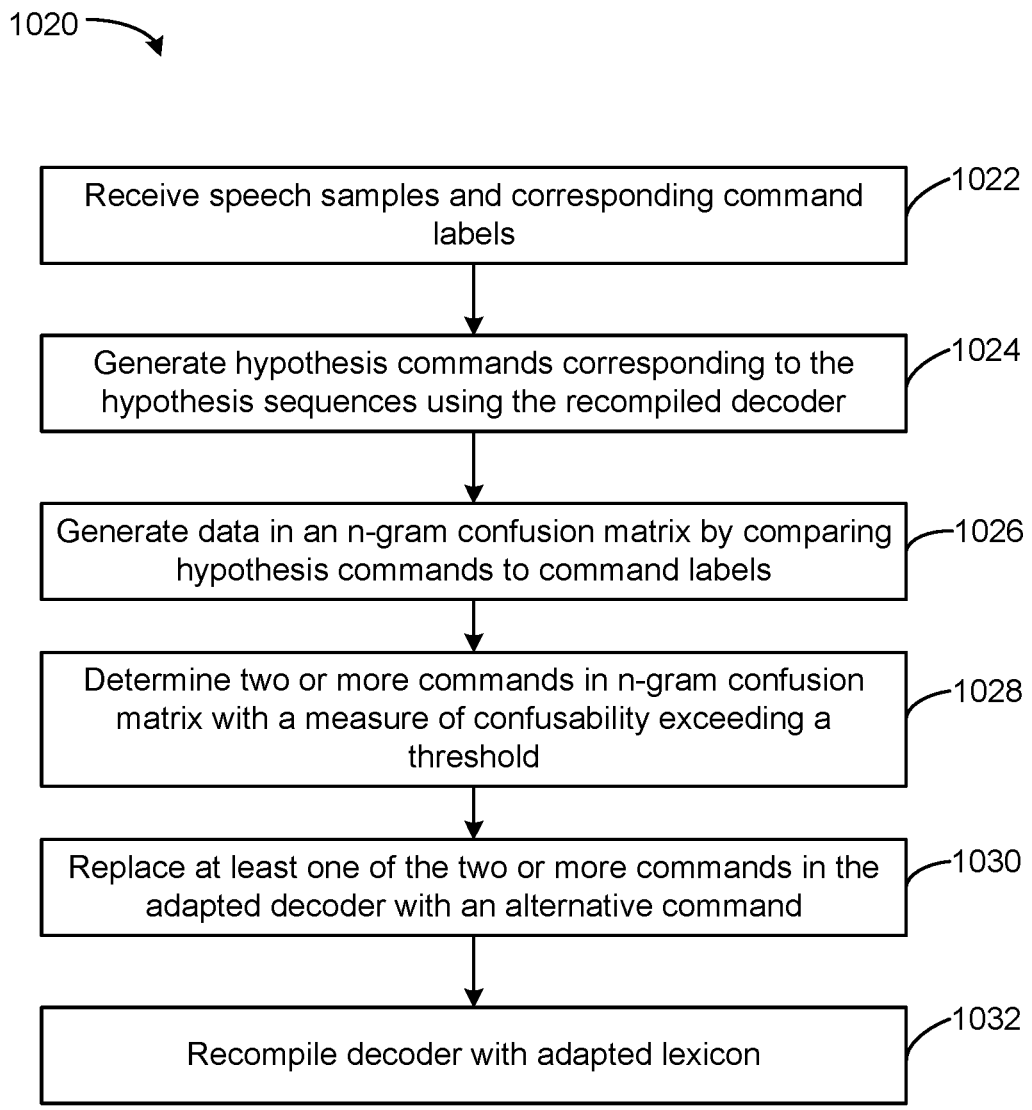
FIG. 10B is a flow diagram of a method for adaptively reducing confusability of commands in an adapted lexicon, according to some embodiments.

Referring now to FIGS. 10A and 10B, a block diagram and method are shown for measuring and reducing confusability between commands recognized by an adaptive decoder, according to one embodiment. Confusable commands may be identified based on weighted values of lexeme entries or by testing speech samples in the ASR system. Alternate commands may be retrieved from memory or a networked device, or may be generated based on stored rules and substitutions. The alternate commands may then be selected and incorporated into the adapted lexicon by replacing one or more of the confusable commands in the adapted lexicon.

Referring to FIG. 10A, a block diagram is shown for measuring confusability of labelled speech samples 1002. The labelled speech samples 1002 may be the same as or different than the labelled speech samples 902. The labelled speech samples 1002 may be retrieved from a database of speech samples or from spoken utterances of the user with known labels. The labelled speech samples 1002 include an utterance audio signal with various words, phrases, and noise characteristics and a corresponding command label indicating the spoken command. The utterance audio signal may be input into the ASR system 1004 to output a hypothesis command. In some embodiments, the ASR system 1004 includes an adaptive decoder recompiled after expanding an adapted lexicon by the method 920. In some embodiments, rather than passing the utterance audio signal through the entire ASR system 1004, the hypothesis sequences generated in the method 920 are input into the recompiled adaptive decoder to generate the hypothesis command. The hypothesis commands are then sent to the command adapter 714.

Command adapter 714 may then compare the hypothesis command to the command label from the database of the labelled speech samples 1002. The comparison of the hypothesis command and the command label may be measured and recorded in an n-gram confusion matrix 1006. The n-gram confusion matrix 1006 may comprise values indicating the number or percentage of occurrences of true positive and false positive events of commands recognizable by the ASR system 1004. The n-gram confusion matrix may compute true positive and false positive events for entire commands, phrases in the commands, individual words in the commands, or parts of words in the commands. As additional speech samples are tested for the given ASR system 1004, the values in the n-gram confusion matrix 1006 may be recomputed by command adapter 714 to account for the additional data points.

After computation of the n-gram confusion matrix 1006, the command adapter 714 may determine that two or more commands of the n-gram confusion matrix 1006 exhibit an unacceptable level of confusability. Confusability may imply that the two or more commands have a probability of classification error exceeding a threshold value, wherein the commands are classified as one of the other confusable commands by the decoder. For example, a technician may decide that an acceptable accuracy rate for the decoder is 90%, and thus any two or more commands than have a false positive rate of 10% of each other may be deemed confusable commands. Responsive to the determination of two or more confusable commands, the command adapter 714 may select one of the two or more confusable commands to replace in the appropriate dynamic command list. The command adapter 714 may then retrieve one or more alternate commands for the selected confusable command from the synonym database 716. In some embodiments, the one or more alternate commands are generated based on store rules or substitute words and phrases.

The command adapter 714 may then determine which of the one or more alternate commands to incorporate into the adapted lexicon, and accordingly add the determined alternate commands to the appropriate dynamic command list 1008 (e.g., the dynamic command list compiled for the decoder in ASR system 1004). The command adapter 714 may then send a control signal to a decoder compiler to recompile the adaptive decoder with the updated dynamic command list. Alternatively, the alternate commands may be sent to the decoder compiler to directly update on the adapted lexicon.

Referring now to FIG. 10B, a method 1020 is shown for measuring and reducing confusability between commands recognized by an adaptive decoder in an ASR system. The method 1020 may be implemented by the decoder compilation manager 708 as shown by the components in FIG. 10A. Method 1020 generally identifies confusable commands in an adaptive decoder using labelled speech samples, determines alternate commands for the confusable commands, and recompiles the decoder with the alternate commands of the confusable commands. Method 1020 may be executed after expansion of the adaptive decoder by method 920, for example.

At 1022, labelled speech samples are received for measuring the confusability of commands by the decoder. Labelled speech samples may generally include an audio signal corresponding to speech and a command label of a spoken command or phrase. In some embodiments, the labelled speech samples are the hypothesis sequences generated by the compressed acoustic engine. The labelled speech samples may be retrieved from a local or networked storage device or may be based on spoken speech samples of the user of a device operating the ASR system. The labelled speech samples may be of varying length with varying degrees of noise. In some embodiments, the labelled speech samples are speaker-specific for the user of the ASR system.

At 1024, audio signals of the speech samples are input into the ASR system to output hypothesis commands. In some embodiments, the speech samples are input into a compressed acoustic engine of the ASR system to generate a grapheme or phoneme sequence, and the grapheme or phoneme sequence is input into a decoder of the ASR system to generate the hypothesis command or phrase. The hypothesis commands may be based on the recompiled decoder after expansion of the decoder.

At 1026, an n-gram confusion matrix is generated to measure the confusability of commands recognizable by the decoder. The n-gram confusion matrix may be generated by comparing the hypothesis command to the command label from the labelled speech sample and measuring true positive and false positive events. In some embodiments, the n-gram confusion matrix is based on subcomponents of the hypothesis command, such as substituent groups of letters, individual words, or groups of words. The n-gram confusion matrix generally illustrates the confusability of commands recognized by the adaptive decoder from the output of the compressed acoustic engine. For example, an entry in the n-gram confusion matrix may represent the number of times a first command is classified as a second command. The n-gram confusion matrix may be generated for N data samples, and may divide each entry by N to determine the accuracy or error as a percentage rate.

At 1028, two or more confusable commands are identified based on a respective measure of confusability exceeding a threshold value, the measure of confusability based on values in the n-gram confusion matrix. For example, two commands may be deemed confusable based on their corresponding matrix values exceeding an accepted threshold value. In some embodiments, the matrix value for a first command may be compared against each false positive rate of the first command (e.g., the false positive rate of the first command being confused as a second command vs. the false positive rate of the first command being confused as a third command) to determine a relative level of confusability. Other thresholds of confusability should be appreciated.

At 1030, at least one of the two or more commands are replaced in the adapted lexicon with alternate commands. In some embodiments, the at least one of the two or more commands for replacement are determined to minimize the number of replacements. For example, the at least one of the two or more commands for replacement may be selected based on the confusable command with the highest false positive error rate (e.g., is confused with the most commands). The alternate commands may be determined for each of the confusable commands to be replaced. The alternate commands may be retrieved from a memory of synonyms, such as a thesaurus or action ontology. In some embodiments, the alternate commands are generated by replace one or more words in the confusable commands with substitute words or phrases. Several alternate commands may be determined for a confusable command, wherein one of the alternate commands is selected to replace the confusable command. The selection of the alternate command may be based on weighted values stored in the thesaurus or action ontology, chosen randomly, or chosen based on user input.

At 1032, the adaptive decoder of the ASR system is recompiled to reflect the substituted command in the adapted lexicon. Recompilation of the adapted decoder may be based on updating a dynamic command list with the alternate commands replacing the corresponding confusable command, and recompiling the adapted lexicon or adaptive decoder based on the updated dynamic command list. In some embodiments, the replaced confusable command is removed from a base lexicon used to compile the adapted lexicon and the alternate command is added to the base lexicon. In some embodiments, recompilation of the adapted decoder includes recompiling a language model based on the adapted lexicon and the updated command list. After compilation of the ASR system, the decoder no longer recognizes the replaced confusable command, improving the command recognition accuracy of the system.

Method 1020 may be repeated multiple times until the command recognition rate reaches an acceptable or steady state. Each iteration of method 1020 may include renormalizing or recomputing weighted values in the adapted lexicon based on the removal and addition of entries in the lexicon.

Figure 11:
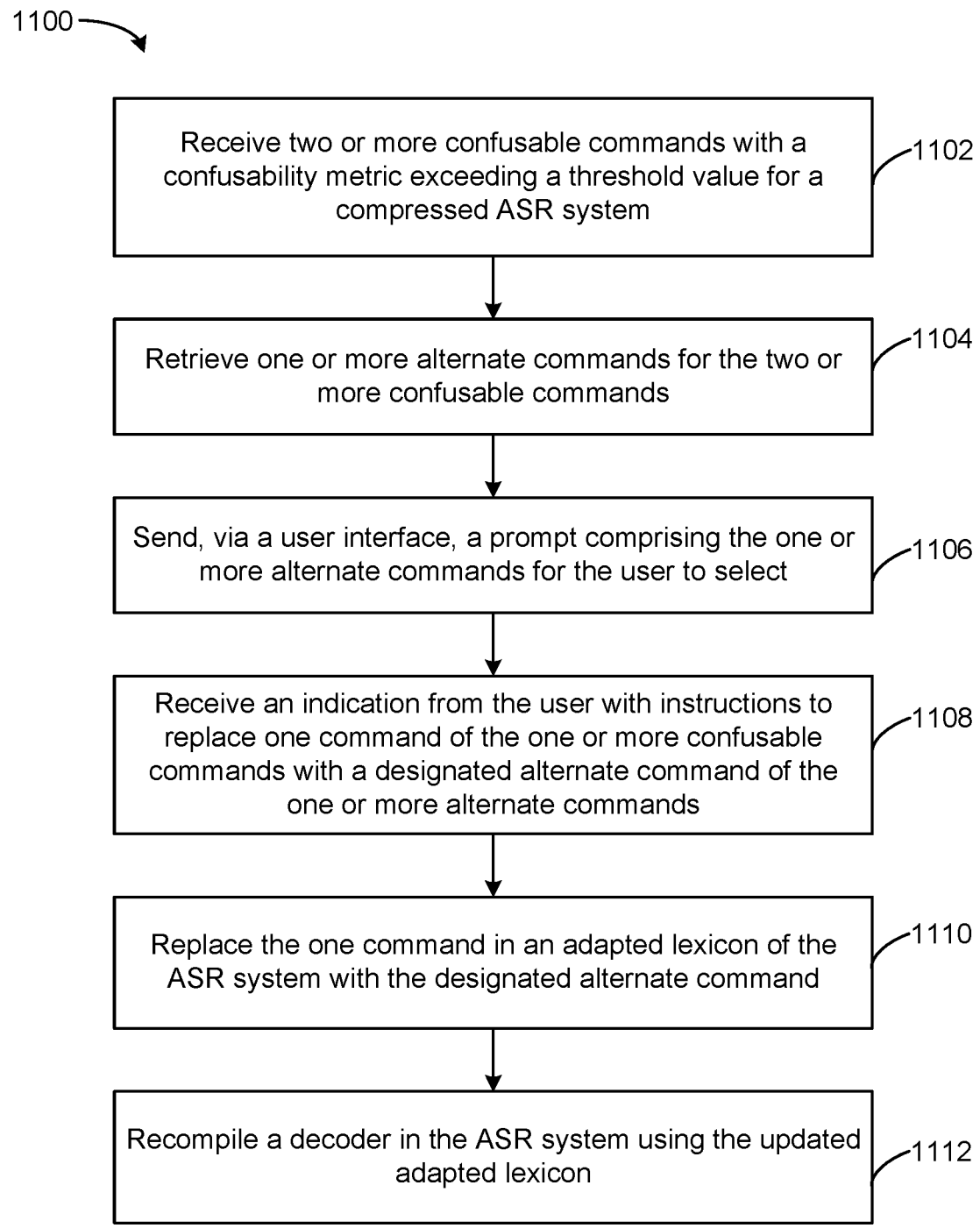
FIG. 11 is a flow diagram of a method for replacing commands in an adapted lexicon via a user interface, according to some embodiments.

Referring now to FIG. 11, a method 1100 is shown for resolving highly confusable commands in a lexicon of an ASR system. The method 1100 may be implemented by decoder compilation manager 708 or application processor 108, for example. The method 1100 may be used for an adapted lexicon or a context-specific dynamic command list. Method 1100 generally determines an alternate command for replacement of a confusable command by sending a listing of potential substitute commands to a user via a user interface and receives a selection of an alternate command to replace the confusable command in the adapted lexicon model.

At 1102, a first command and a second command are received, wherein the first command and the second command have a confusability metric indicating the first command and the second command are highly confusable. In some embodiments, the confusability metric is a probability that the first command is falsely identified as the second command, and the probability indicates the commands are highly confusable if the probability exceeds a threshold value. The first command and second command may be determined based on tested speech samples or by weighted values associated with the first command and the second command in a lexicon of the ASR system.

At 1104, one or more alternate commands for the first command and the second command are retrieved. The one or more alternate commands may correspond to one of the first command or the second command, or may variously correspond to the first command and the second command. In some embodiments, the one or more alternate commands are determined based on substituting one or more words of the first command or second command for a synonym or semantically equivalent word or phrase. In some such embodiments, the one or more alternate commands include a semantically equivalent extension of the first command or the second command. Any other alternate command as discussed herein can be determined or retrieved at 1104.

At 1106, a prompt is sent to a user via a user interface with the one or more alternate commands from which the user may select. In some embodiments, the user may select which of the first command or second command to replace with a designated alternate command from the one or more alternate commands. In some embodiments, the prompt is displayed on a graphical user interface of a user's mobile device capable of receiving a selection by the user. In some such embodiments, the display may show the alternate commands in association with corresponding confusable command as selectable options, where the user may be able to select from the one or more replacement pairs for replacement in the ASR system. In some embodiments, the prompt is a verbal prompt outputted via a speaker to the user with replacement options selectable by the user, in which the user speaks a return selection of one or more options via a microphone. In some embodiments, the prompt includes an additional input wherein the user can indicate to make the replacement for all command lists or contexts of the application device, or only make the replacement for the specific command list.

At 1108, an indication is received from the user with instructions to replace one command of the first command and second command with a designated alternate command of the one or more alternate commands. As discussed in regards to 1106, the selection may be received from a GUI displayed to the user or another user interface. The indication may be to replace a first confusable command with a designated alternate command selected by the user from several potential alternate commands. The indication may include multiple confusable commands to replace in the ASR system. In some embodiments, the instructions may include an indication to make the appropriate replacement in all dynamic command lists.

At 1110, the one command is replaced in an adapted lexicon with the designated alternate command. The replacement may include updating a dynamic command list used to generate the adapted lexicon and recompiling the adapted lexicon based on the update. Replacement of the one command may reduce confusability of commands recognized in the adapted lexicon, and thus improve accuracy of the ASR system. At 1112, a decoder incorporated into the ASR system is recompiled using the updated lexicon and/or updated dynamic command list. For example, a language model may be recompiled based on the dynamic command list and adapted lexicon and sent to the decoder.

Configuration of the Exemplary Embodiments

It should be appreciated that the features, functions, and systems of the present application can be arrange in computing devices beyond those disclosed herein. For example, any of the components or processing of the adaptive ASR system can be implemented on the application processor, a back-end server, or separate server. It should also be appreciated that the modules and components of the adaptive ASR system can be implemented as hardware components within a processor, software instructions configured to cause a processor to execute a function, or a combination of hardware and software implementations.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A user device, comprising:
   a processing circuit;
   an acoustic engine;
   a decoder; and
   memory storing instructions that, when executed by the processing circuit, cause the user device to:
   expand a speech lexicon of the decoder with recovered grapheme or phoneme sequences corresponding to a first command and a second command represented in the speech lexicon;
   renormalize weights of the speech lexicon corresponding to the first command and the second command in the speech lexicon based on hypothesis sequences and error rates of the acoustic engine;
   determine a confusability metric corresponding to classification of the first command and the second command by the decoder, the confusability metric indicative of a probability the first command is classified as the second command, the confusability metric based on the renormalized weights;
   determine an alternate command corresponding to the first command or the second command, the alternate command phonetically different than the first command or the second command; and
   replace the first command or the second command in the speech lexicon with the alternate command responsive to a determination the confusability metric exceeds a threshold value.

2. The user device of claim 1, wherein the confusability metric is a value in an n-gram confusion matrix.

3. The user device of claim 1,
   wherein the processing circuit is further configured to determine a single command from the group consisting of the first command and the second command to replace in the speech lexicon, and
   wherein the alternate command corresponds to the single command.

4. The user device of claim 3, wherein the user device further comprises a user interface, wherein the determination of the single command is based on a user input.

5. The user device of claim 4,
   wherein the alternate command is a selected alternate command, and
   wherein to determine the selected alternate command, the instructions cause the user device to:
   retrieve a first alternate command corresponding to the first command and a second alternate command corresponding to the second command;
   send, via the user interface, a prompt to a user, the prompt comprising a request to select a first option to replace the first command with the first alternate command or a second option to replace the second command with the second alternate command; and
   receive, via the user interface, an indication from the user of a selection of the first option or the second option, wherein the first alternate command or the second alternate command is designated as the selected alternate command based on the selection.

6. The user device of claim 4,
   wherein the alternate command is a selected alternate command, and
   wherein to determine the selected alternate command, the instructions cause the user device to:
   retrieve a first alternate command and a second alternate command, the first alternate command and the second alternate command corresponding to the single command;
   send, via the user interface, a prompt to a user, the prompt comprising a request to select a first option to replace the first command with the first alternate command or a second option to replace the first command with the second alternate command; and
   receive, via the user interface, an indication from the user of a selection of the first option or the second option, wherein the first alternate command or the second alternate command is designated the selected alternate command based on the selection.

7. The user device of claim 1, wherein the acoustic engine comprises a compressed acoustic model, the compressed acoustic model configured in less than 10 MB of memory storage.

8. The user device of claim 1, wherein the instructions cause the user device to remove the first command or the second command from a list of context-specific commands from which the decoder is compiled.

9. The user device of claim 8, wherein the instructions cause the user device to add the alternate command to the list of context-specific commands, the alternate command performing the same function as the removed first command or second command.

10. A user device, comprising:
    a processing circuit:
    an acoustic engine configured to generate hypothesis sequences from speech utterances, the acoustic engine comprising a compressed acoustic model;
    a decoder including a speech lexicon, the speech lexicon comprising grapheme or phoneme sequences in association with command labels; and
    memory storing instructions that, when executed by the processing circuit, cause the user device to:
    determine grapheme or phoneme sequences with a classification error measurement exceeding a first threshold value, the classification error measurement based on an output of the compressed acoustic model, expand the speech lexicon with the grapheme or phoneme sequences, renormalize weights of the speech lexicon corresponding to a first command and a second command in the speech lexicon based on the hypothesis sequences and error rates of the acoustic engine, determine a confusability metric of the first command and the second command, the confusability metric based on the renormalized weights, determine an alternate command corresponding to the first command or the second command, and replace the first command or the second command in the speech lexicon with the alternate command responsive to a determination the confusability metric satisfies a second threshold value.

11. The user device of claim 10,
wherein the first command is associated with a first renormalized weight, and the second command is associated with a second renormalized weight, and
wherein the second threshold value is satisfied when a difference between the first renormalized weight and the second renormalized weight is less than the second threshold value.

12. The user device of claim 10, wherein the alternate command corresponds to one of the first command or the second command, the alternate command semantically equivalent to the one of the first command or the second command and is phonetically different than the one of the first command or the second command.

13. The user device of claim 10, further comprising a user interface, wherein the alternate command is determined based on a user input.

14. The user device of claim 13,
wherein the alternate command is a selected alternate command, and
wherein the instructions cause the user device to:
retrieve a first alternate command corresponding to the first command and a second alternate command corresponding to the second command,
send, via the user interface, a prompt to a user, the prompt comprising a request to select a first option to replace the first command with the first alternate command or a second option to replace the second command with the second alternate command, and
receive, via the user interface, an indication from the user of a selection of the first option or the second option, wherein the first alternate command or the second alternate command is designated as the selected alternate command based on the selection.

15. The user device of claim 13,
wherein the alternate command is a selected alternate command, and wherein the instructions cause the user device to:
retrieve a first alternate command and a second alternate command, the first alternate command and the second alternate command corresponding to the first command,
send, via the user interface, a prompt to a user, the prompt comprising a request to select a first option to replace the first command with the first alternate command or a second option to replace the first command with the second alternate command, and
receive, via the user interface, an indication from the user of a selection of the first option or the second option, wherein the first alternate command or the second alternate command is designated the selected alternate command based on the selection.

16. The user device of claim 10, wherein the compressed acoustic model is stored in less than 10 MB of memory storage.

17. A method, comprising:
determining grapheme or phoneme hypothesis sequences of a compressed acoustic model with an error measurement exceeding a first threshold value;
expanding a speech lexicon with the grapheme or phoneme hypothesis sequences;
renormalizing weights of the speech lexicon corresponding to lexicon entries of the grapheme or phoneme hypothesis sequences based on the grapheme or phoneme hypothesis sequences and error rates of an acoustic engine corresponding to the compressed acoustic model;
determining a first command and a second command with a confusability metric exceeding a second threshold value, the confusability metric based on the renormalized weights;
determine an alternate command corresponding to one of the first command or the second command;
removing the one of the first command or the second command from the speech lexicon; and
expanding the speech lexicon to include an entry for the alternate command.

18. The method of claim 17, wherein the alternate command is semantically equivalent but phonetically different than the corresponding one of the first command or the second command.

19. The method of claim 18, further comprising:
sending a prompt to a user with a request to replace the corresponding one of the first command or the second command with the alternate command.

20. The method of claim 17, further comprising removing the first command or second command from a list of context-specific commands from which the speech lexicon is compiled.

* * * * *